(12) United States Patent
Fleury et al.

(10) Patent No.: US 8,130,219 B2
(45) Date of Patent: Mar. 6, 2012

(54) METADATA FOR AVATAR GENERATION IN VIRTUAL ENVIRONMENTS

(75) Inventors: Michel Fleury, Montreal (CA); David Chamandy, Montreal (CA)

(73) Assignee: AUTODESK, Inc., San Rafael, CA (US)

( * ) Notice: Subject to any disclaimer, the term of this patent is extended or adjusted under 35 U.S.C. 154(b) by 773 days.

(21) Appl. No.: 12/155,886

(22) Filed: Jun. 11, 2008

(65) Prior Publication Data

US 2008/0309675 A1 Dec. 18, 2008

Related U.S. Application Data

(60) Provisional application No. 60/929,053, filed on Jun. 11, 2007, provisional application No. 60/929,054, filed on Jun. 11, 2007, provisional application No. 60/929,055, filed on Jun. 11, 2007, provisional application No. 60/929,056, filed on Jun. 11, 2007.

(51) Int. Cl.
| | |
|---|---|
| G06F 17/00 | (2006.01) |
| G06F 15/16 | (2006.01) |
| G06F 3/048 | (2006.01) |
| G06F 3/00 | (2006.01) |
| G09G 5/00 | (2006.01) |
| A63F 9/24 | (2006.01) |

(52) U.S. Cl. ........ 345/418; 345/619; 345/630; 345/639; 345/551; 463/1; 463/32; 463/42; 463/43; 709/201; 709/217; 709/231; 709/238; 715/706; 715/733; 715/757; 715/850

(58) Field of Classification Search .......... 345/418–420, 345/619, 639, 551, 473–475, 629–630, 653; 463/1, 31–32, 42–43; 707/705; 709/201, 709/203, 217–219, 223–231, 238, 250; 715/700, 715/706, 730–733, 734–737, 757, 764, 833, 715/850, 974, 965
See application file for complete search history.

(56) References Cited

U.S. PATENT DOCUMENTS

| | | | |
|---|---|---|---|
| 5,568,599 | A | 10/1996 | Yoshino et al. |
| 5,808,624 | A | 9/1998 | Ikedo |
| 5,880,731 | A | 3/1999 | Liles et al. |
| 6,154,217 | A | 11/2000 | Aldrich |

(Continued)

FOREIGN PATENT DOCUMENTS

WO WO0159709 A1 8/2001

(Continued)

OTHER PUBLICATIONS

ISA/CA, "International Search Report", mailed Sep. 16, 2008, pp. 1 to 4.

(Continued)

Primary Examiner — Wesner Sajous
(74) Attorney, Agent, or Firm — Patterson & Sheridan, LLP

(57) ABSTRACT

A method of provisioning avatars comprises receiving at a first computer system associated with a first user, a metadata file relating to an avatar of a second user. In particular, the metadata file comprises data for use with an avatar generator process that is in execution on the first computer system. Data is extracted from the metadata file, and is provided as input data to the avatar generator process, thereby generating locally to the first computer system the avatar of the second user. The avatar of the second user so generated is displayed to the first user within a virtual environment.

27 Claims, 14 Drawing Sheets

U.S. PATENT DOCUMENTS

| | | | |
|---|---|---|---|
| 6,227,974 | B1 | 5/2001 | Eilat et al. |
| 6,397,080 | B1 | 5/2002 | Viktorsson et al. |
| 6,545,682 | B1 * | 4/2003 | Ventrella et al. ............... 345/473 |
| 6,563,503 | B1 | 5/2003 | Comair et al. |
| 7,006,093 | B2 | 2/2006 | Fujiwara et al. |
| 7,025,675 | B2 | 4/2006 | Fogel et al. |
| 7,173,625 | B2 | 2/2007 | Nam et al. |
| 7,176,956 | B2 | 2/2007 | Rzeszewski et al. |
| 7,184,047 | B1 | 2/2007 | Crampton |
| 7,231,205 | B2 | 6/2007 | Buyot et al. |
| 7,250,949 | B2 | 7/2007 | Claus et al. |
| 7,468,729 | B1 | 12/2008 | Levinson |
| 7,574,332 | B2 | 8/2009 | Ballin et al. |
| 7,667,974 | B2 | 2/2010 | Nakatani et al. |
| 7,677,974 | B2 * | 3/2010 | Van Luchene ................. 463/29 |
| 7,707,520 | B2 | 4/2010 | Ashtekar et al. |
| 7,733,338 | B2 | 6/2010 | Couture-Gagnon |
| 7,806,758 | B2 | 10/2010 | Van Luchene |
| 7,840,903 | B1 * | 11/2010 | Amidon et al. ............... 715/757 |
| 7,912,793 | B1 * | 3/2011 | Danzig et al. ................. 705/400 |
| 7,913,176 | B1 | 3/2011 | Blattner et al. |
| 2004/0250210 | A1 | 12/2004 | Huang et al. |
| 2005/0026685 | A1 | 2/2005 | Ruark et al. |
| 2005/0162419 | A1 * | 7/2005 | Kim et al. ..................... 345/419 |
| 2006/0195789 | A1 * | 8/2006 | Rogers et al. ................. 715/727 |
| 2006/0294465 | A1 | 12/2006 | Ronen et al. |
| 2007/0123327 | A1 | 5/2007 | Van Luchene |
| 2007/0273711 | A1 | 11/2007 | Maffei |
| 2007/0298866 | A1 | 12/2007 | Gaudiano et al. |
| 2008/0147424 | A1 * | 6/2008 | Rowan et al. ..................... 705/1 |
| 2009/0055754 | A1 * | 2/2009 | Finn et al. ..................... 715/757 |
| 2010/0018382 | A1 * | 1/2010 | Feeney et al. ................... 84/615 |
| 2010/0070859 | A1 * | 3/2010 | Shuster et al. ................. 715/706 |
| 2010/0118025 | A1 * | 5/2010 | Smith et al. ................... 345/418 |
| 2010/0121915 | A1 | 5/2010 | Wang |

FOREIGN PATENT DOCUMENTS

| | | |
|---|---|---|
| WO | WO2004/019281 A1 | 3/2004 |
| WO | WO2006065005 A1 | 6/2006 |

OTHER PUBLICATIONS

Office Action for U.S. Appl. No. 12/155,723 dated Apr. 22, 2011.
Office Action for U.S. Appl. No. 12/155,724 dated May 12, 2011.
Office Action for U.S. Appl. No. 12/155,727 dated Apr. 28, 2011.
Office Action for U.S. Appl. No. 12/155,725 dated Mar. 11, 2011.

* cited by examiner

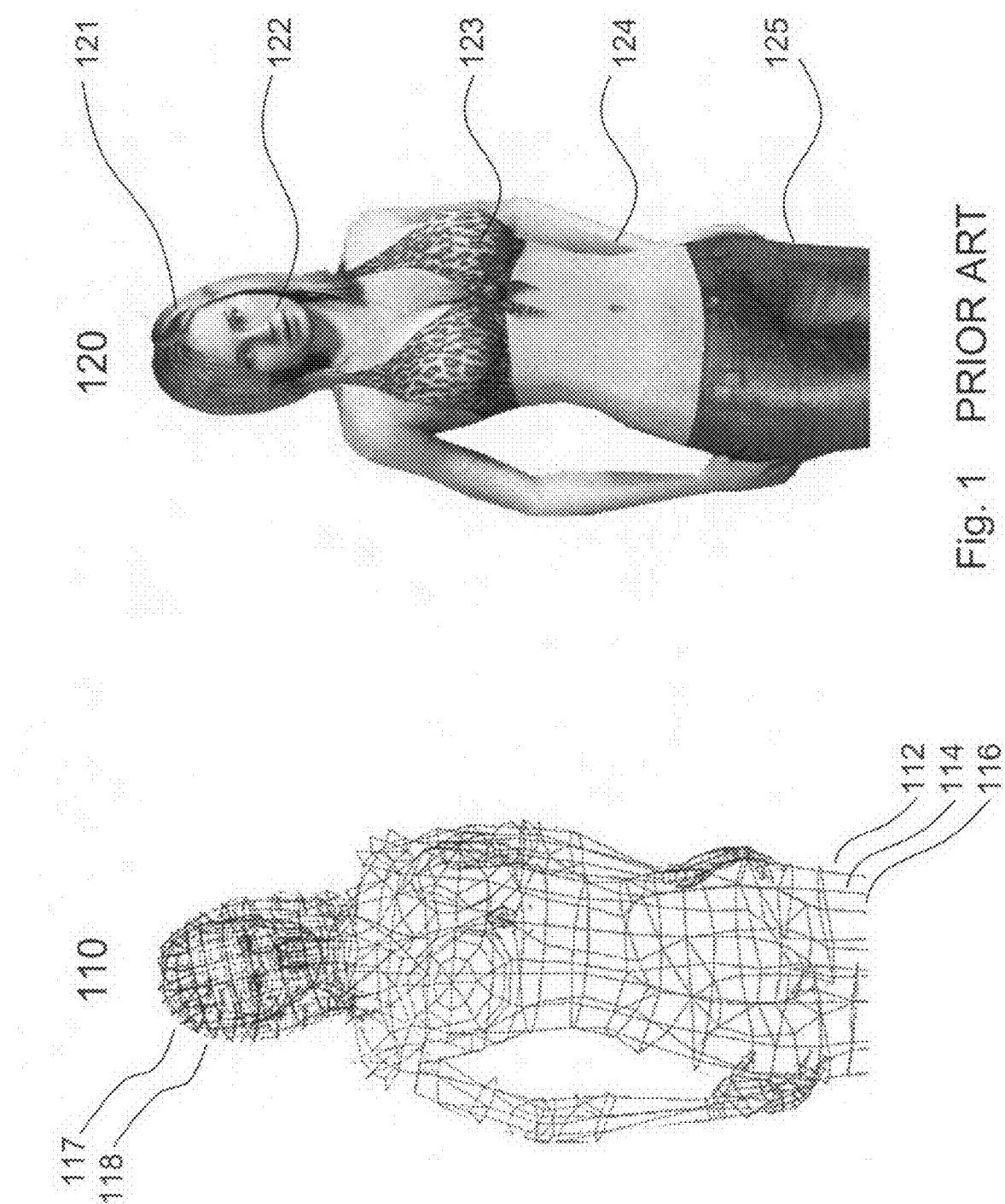

| | | | |
|---|---|---|---|
| User Identity | Jane Doe | Created | January 3, 2008  11:15 |
| Nickname | Doe Rae Me | Last Modified | April 15, 2008  15:30 |
| | | | |
| HEAD | | Contact Lens | No |
| Paternal Grandfather | Steph | Glasses | |
| Paternal Grandmother | Pam | Jewellery | Rose |
| Paternal Slider Setting | 50% | Tatoo 1 | No |
| Maternal Grandfather | Anthony | Tatoo 2 | No |
| Maternal Grandmother | Eleanor | Ear Piercing | |
| Maternal Slider Setting | 50% | | |
| Father-Mother Setting | 80% | | |
| | | Shirt/Blouse | Calvin Klein Tank 3 |
| BODY | | Trousers/Pants | Calvin Klein Jean 5 |
| Paternal Grandfather | Steph | Skirt | No |
| Paternal Grandmother | Pam | Headwear | No |
| Paternal Slider Setting | 100% | Neckwear | Liberty Brit Scarf |
| Maternal Grandfather | Anthony | Skirt Length | N/A |
| Maternal Grandmother | Eleanor | Pantyhose | Mini Socks Red |
| Maternal Slider Setting | 70% | Footwear | BCBGirls Onella Black |
| Father-Mother Setting | 20% | Jacket | Creenstone Drawstring |
| Body Colour | Igor | | |
| | | | |
| Height | 1m 75cm | | |
| Neck Setting | 30% | | |
| Head Setting | 50% | | |
| Eyes | 20% | | |
| Cranium | 50% | | |
| Ear | 50% | | |
| Nose | 90% | | |
| Hairstyle | Normal B | | |
| Beard | Full | | |

METADATA FOR AVATAR GENERATION IN VIRTUAL ENVIRONMENTS

This application claims the benefit of U.S. Provisional Applications No. 60/929,053, No. 60/929,054, No. 60/929,055, and No. 60/929,056, all of which were filed on Jun. 11, 2007, the entire contents of which are incorporated herein by reference.

FIELD OF THE INVENTION

The invention relates to avatar generation with virtual environments and more particularly to improving transmission of such avatars within networks by DNA-based metadata.

BACKGROUND OF THE INVENTION

Computer animation, the art of creating moving images via the use of computers, is a common form of audio-visual presentation, where the provided content ranges from television programming, feature movies, short films, cartoons, music videos, computer games, video games, and more recently virtual environments. Further, these different forms of computer animation, traditionally presented to the user via a television or within the movie theatre are now presented with, and supported by, a multitude of electronic devices including personal computers (PCs), laptop computers, Personal Digital Assistants (PDAs), video game consoles (consoles), handheld game consoles (handhelds), cellular telephones (cellphones), and portable multimedia players.

Economically, such computer animation in the form of physical and online sales represents a global business today of approximately $40 billion in 2006, and this is expected to grow to over $65 billion by 2010. Dominant segments of this market today are computer animated feature films, computer games, console games and handheld games. However, the market is expected to include additionally in the near future significant revenue from virtual environments, also known as virtual worlds, Collaborative Virtual Environments (CVEs), Multi-User Virtual Environments (MUVEs), or Massively Multiplayer Online Games (MMOGs). MMOGs refers to a wider range of environments than games, which are commonly referred to as Massively Multiplayer Online Role-Playing Games (MMORPG), as these MMOGs may include social networks (such as Second Life™ and Kaneva™) through to adult only entertainment (such as Red Light Center™).

With virtual environments reaching millions of users, together with other elements such as monthly subscriptions for all features and the ability to provide avatars with finances via payments from the user's real world finances, it is evident that these virtual environments already generate significant financial revenues. Developments such as the provisioning of virtual shopping environments, where users purchase and receive in reality their selections, as well as the addition of other services offered at a premium, coupled with the number of users growing to tens, if not hundreds of millions, reveals that the commercial revenue from such virtual environments may exceed that of all other physical and online sales of computer animation products and services in the very near future.

However, a couple of significant barriers exist to the widespread deployment of these virtual environments; notably, their resulting commercial success relies on the quality of the users computer persona, their avatars, and the ability of the user to generate characters that are essentially as unique as they are, the provisioning of software to users free of charge to generate their persona, and the amount of data to be transmitted to the online users in the virtual environments. The first arises from the users expectations of virtual environments to reflect reality in complexity and quality of audio-visual experience, whilst the second is an aspect of human nature. Provisioning software free is an aspect of the reality of engaging users into the virtual environment, initially for free and then through the offering of full access or enhanced services in return for a monthly fee, typically a few dollars to tens of dollars. Finally, the amount of data to be transmitted scales directly today with the number of avatars within a given environment simultaneously, and with the quality of the avatars being presented to the users. Throughout the remainder of this document the term "avatar" is employed to refer to a computer animated character. Originating from video games, "avatars" are essentially a player's physical computer animated representation in the game world.

In computer animation, commercially available systems are essentially digital successors to the art of stop motion animation of 3D models and frame-by-frame animation of 2D illustrations. Some examples of current animation software include Amorphium®, Art of Illusion®, Poser®Ray Dream Studio®, Bryce®, Maya®, Blender®, TrueSpace®, Lightwave®, 3D Studio Max®, SoftImage XSI®, Alice®, and Adobe Flash® (2D). For 3D animations of characters, the characters are modeled on the computer monitor and 3D figures are rigged with a virtual skeleton. For 2D figure animations, separate illustrations and separate transparent layers are used, with or without a virtual skeleton. Then the limbs, eyes, mouth, clothes, etc. of the figure are moved by the animator on key frames. The differences in appearance between key frames are automatically calculated by the computer in a process known as tweening or morphing. Finally, the animation is rendered, the rendering providing the features of the skin, clothing, etc.

Such commercial animation software, costing from several hundreds of dollars to tens of thousands of dollars, is not designed for widespread release to millions of users with varying degrees of computer skills, nor for free distribution. As a result typically today a virtual environment offers the player a single avatar or a predetermined limited set of avatars from which to select as the basis of their "player" within the game. As such these avatars have been generated typically in accordance with the process presented supra in respect of skeletons, wire-frames, and rendering. Online virtual environments such as the virtual social community Second Life™ provide only 12 avatars for the user to select from, whilst video games such as "Alien Arena 2007" from COR Entertainment offers 11 avatars for the player to base their player upon.

Recently, in order to reduce the complexity of the process for generating avatars, some commercial software suites have been developed that offer the animator such a library of stock avatars from which to select. One such leading commercial software suite being "iClone 2.0" from RealIllusion, which offers 15 base avatars for the animator to select from and manipulate in a limited manner. However, it is worth noting that even offering 100 avatar variants would result in an average of 10,000 repetitions for every one million users, and some variants such as say a beautiful young female character may be disproportionately popular. The repetitive presentation of the same avatars visually to the user but as different "personalities" due to their unique users represents a confusion and frustration to the user. It would therefore be beneficial to provide a way for an animator to rapidly generate an avatar and manipulate their characteristics. Further, rather than requiring the animator to always envision, provide a skeleton, wire frame and render their avatar completely it would be beneficial to provide a solution offering the animator the ability to start or select a relatively small number of input selections, and provide simple intuitive interfaces allowing them to focus their creative skills on the manipulation and refinement of the avatar, whilst offering them a wide range of potential outcomes.

Typically, this would today be achieved by the user creating their user account, logging into the remote servers of the provider of the virtual environment and generating their avatar which is then stored at the central server. As the user engages the virtual environment and they encounter new characters then these new characters are downloaded from the central server to the user, this process occurring in proportion for example from the number of users online and their frequency of movement from one part of the virtual environment to another. With the desire for high quality renditions of the avatars in three-dimensions, both physically and in respect of clothing and accessories, a typical avatar will typically be several megabytes (MB) and may reach several tens of MB when the number of mapped polygons and textures are capable of supporting display in high definition environments. Hence, should a user simply walk through a door into a new room with 10 new characters therein, they will be required to download tens of MB at least, and potentially a hundred MB or more. Such download requirements, even with todays high speed access from cable networks, would result in significant pauses whilst new characters are being loaded, which is why today's virtual environments use low quality avatar renditions.

Clearly, the requirement for transferring large amounts of data in respect of the characters causes a significant issue for not only the customer accessing the virtual environment, but also for the provider of the virtual environment who must have an infrastructure supporting every user, which may be tens or hundreds of thousands of users online simultaneously, with high data transfer rates. It would therefore be beneficial to reduce the requirement for data transfer in respect of the avatars entering and exiting the area surrounding the user so that changes in their environment can be reflected quickly. It would be further beneficial for the data transferred to the user in respect of other avatars to relate to the generation of the avatar, allowing the avatar generation to be executed locally by every user according to characteristics contained within a metadata file received and the display characteristics for that user.

SUMMARY OF EMBODIMENTS OF THE INVENTION

In accordance with an aspect of the invention there is provided a method comprising: using an avatar generator process that is in execution on a first computer system associated with a first user, generating an avatar as a combination of at least two other avatars, the generated avatar having a simulated physical appearance that is defined in terms of a plurality of predetermined inheritable characteristics, at least one of the plurality of predetermined inheritable characteristics having a user defined weighting value associated therewith; generating a metadata file relating to the generated avatar, the metadata file including at least a unique identifier of each of the at least two other avatars and the user defined weighting value associated with the at least one of the plurality of predetermined inheritable characteristics; transferring the metadata file via a network to a second computer system that is associated with a second user; and, generating in dependence upon metadata of the metadata file the avatar locally with respect to the second computer system using an avatar generator process that is in execution thereon.

In accordance with an aspect of the invention there is provided a method comprising: receiving at a first computer system associated with a first user, a metadata file relating to an avatar of a second user, the metadata file comprising data for use with an avatar generator process that is in execution on the first computer system; extracting data from the metadata file; providing the extracted data as input data to the avatar generator process that is in execution on the first computer system, thereby generating locally to the first computer system the avatar of the second user; and, displaying to the first user an aspect of the avatar of the second user within a virtual environment.

In accordance with an aspect of the invention there is provided a method comprising: receiving at a first computer system associated with a first user a metadata file relating to an avatar of a second other user, the metadata file for supporting the generation of the avatar of the second user upon the first computer system, the metadata file being other than the generated avatar of the second user; retrieving at least two avatars from a pool of avatars, each avatar retrieved in dependence upon a predetermined metadatum of the metadata file and having a different simulated physical appearance that is defined in terms of a plurality of inheritable characteristics; retrieving a weighting factor for defining a relative contribution of each of the at least two avatars to at least one of the plurality of inheritable characteristics of the avatar of the second user, the weighting factor being a predetermined metadatum of the metadata file; and, generating locally to the first computer system the avatar of the second user, based on the plurality of inheritable characteristics of the at least two avatars and the weighting factor.

BRIEF DESCRIPTION OF THE DRAWINGS

Exemplary embodiments of the invention will now be described in conjunction with the following drawings, in which:

FIG. 1 illustrates a prior art approach to generating an avatar using a wire-frame model and polygon filling;

DETAILED DESCRIPTION OF EMBODIMENTS OF THE INVENTION

Figure 2A:
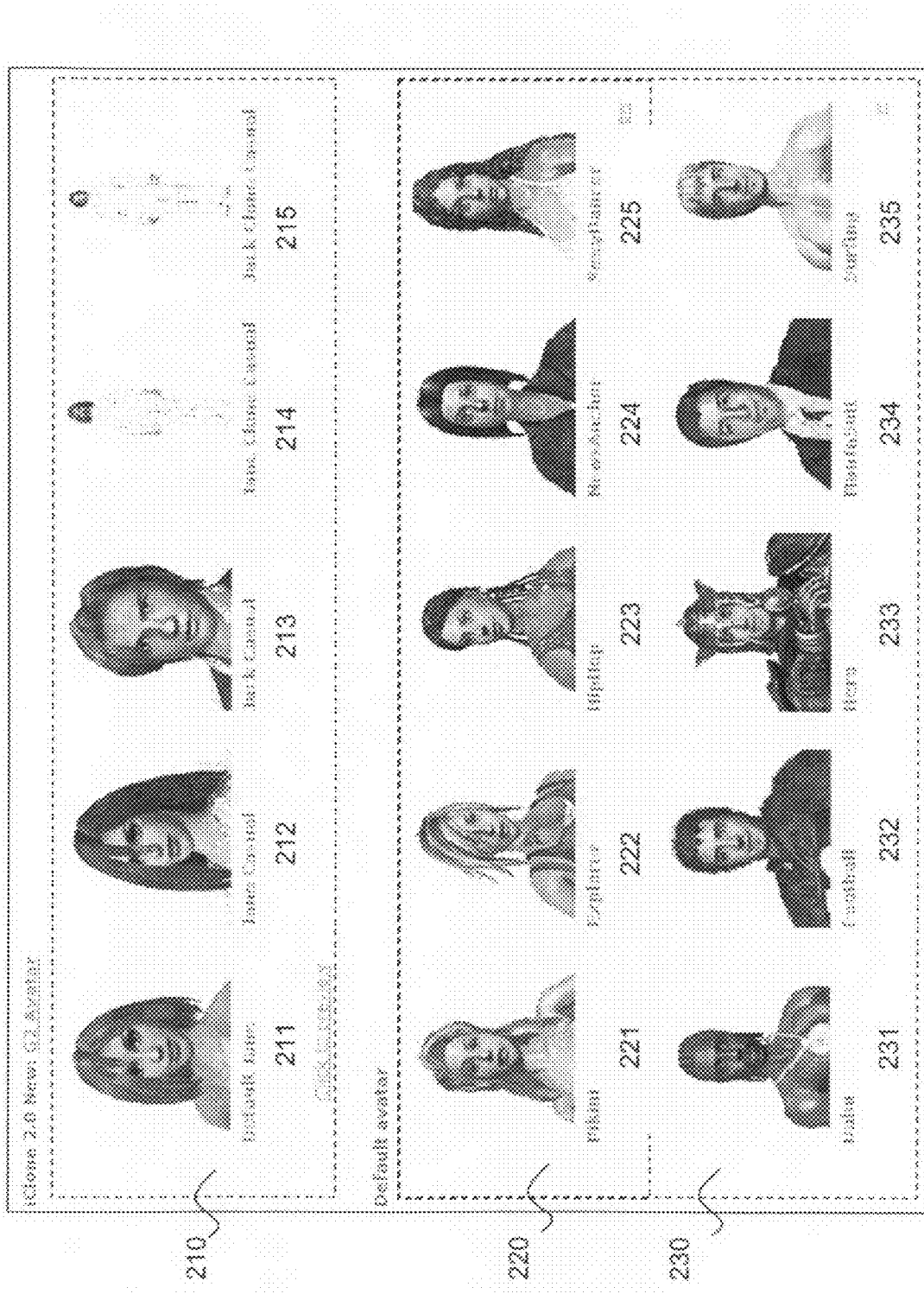
FIG. 2A illustrates a first user view of a prior art software package providing pre-generated avatars for video game programmers.

Referring to FIG. 1 illustrated is a prior art approach to generating an avatar showing a wire-frame model 110 and finished model 120. The wire-frame model 110 is typically generated by the avatar programmer and consists of polygons, such as coarse polygons 112 through 116 in regions of general body shape, and fine polygons 117 and 118 in regions of the body requiring more detail. After completing the wire-frame model 110 the avatar programmer selects the fill for the coarse polygons 112 through 116 and fine polygons 117 and 118 according to the clothing and body of the avatar being generated. The quality of the image provided to the user is determined essentially by the number and size of the polygons used in constructing the wire-frame model 110. A wire-frame model 110 with a low polygon count for a figure will appear as a coarse representation of the figure whereas a wire-frame model 110 with a very high polygon count will appear to have smooth skin, curves, and reflect a figure accurately. However, the issue for the providers of avatars within virtual environments is that the data file representing the avatar scales directly with the number of polygons used to model the figure. Hence, high quality figures require larger data files and hence take longer to transmit from a central server to the user.

Referring still to FIG. 1, the polygons of wire-frame model 110 are filled according to hair 121, face features 122, bikini top 123, body 124 and trousers 125, therein resulting in the finished model 120. The finished model 120 is then stored by the avatar programmer for use within a video game, computer game or other animated audio-visual content. Here again a tradeoff is present in the avatar programmer's generation of the finished model 120. The tradeoff is that the representations of skin, make-up, clothing, jewelry are all improved in portraying reality when the number of color tones used is increased, referred to as textures. Here again, increasing the number of textures increases reality but also increases the amount of data to be transmitted as every polygon is identified not only by the three dimensional coordinates of it's vertices but by either hue, saturation, and lightness (HSL) or hue, saturation, and value (HSV). HSL and HSV being two related representations of points in an RGB color space (red-green-blue color space) to describe perceptual color.

With the proliferation of video games, computer games, animated films, virtual environments etc., an organization generating such content may not wish to expend its resources, financial or physical, in generating avatars. As a result an aspect of the industry is the purchase of pre-designed avatars from an avatar programmer, such as referred to in FIG. 1 generating the finished model 120. An example of an avatar menu 200 is shown in FIG. 2 from the commercial avatar set "iClone 2.0" from iClone Inc. As such the purchaser of the avatar set "iClone 2.0" is presented with an avatar menu 200 comprising three groups, the first being "G2 Avatar" 210, the second being "Girl Avatar" 220, and finally "Boy Avatar" 230. Within the "G2 Avatar" 210 group are three complete avatars, similar to finished model 120 of FIG. 1, being "Default Jane" 211, "Jane Casual" 212, and "Jack Casual" 213. Also within the "G2 Avatar" 210 are partially completed avatars "Jane Clone Casual" 214 and "Jack Clone Casual" 215 which have blank clothing but completed heads and facial features.

"Girl Avatar" 220 as shown comprises clothed and completed models, similar to finished model 120 of FIG. 1 using the "Jane" figure as employed in "Default Jane" 211, "Jane Casual" 212 and "Jane Clone Casual" 214. As such, shown are "Bikini" 221, "Explorer" 222, "HipHop" 223, "News Anchor" 224, and "Sexy Dancer" 225. Similarly "Boy Avatar" 230 as shown comprises clothed and completed models, similar to finished model 120 of FIG. 1 using the "Jack" figure as employed in "Default Jack" 213 and "Jack Clone Casual" 215. As such shown are "Dabu" 231, "Football" 232, "Hero" 233, "Man in Suit" 234, and "Surfing" 235. It would be apparent to the reader that in some instances the avatars by being generated from common source avatars, such as "Jane Clone Casual" 214 and "Jack Clone Casual" 215, have not been executed flawlessly, see for example "Surfing" 235.

A developer of audio-visual content such as a video game or computer game comprising avatars, whether implementing avatars directly, such as discussed supra in respect of FIG. 1, or importing avatars from a commercial library such as presented supra in respect of FIG. 2A, will typically provide a user with an avatar selection page 250. Such an avatar selection page 250 being shown in FIG. 2B and taken from the online virtual reality environment Second Life™ from Linden Lab®. Accordingly the user is provided with two groups, "Females" 260 comprising female avatars 261 through 266, and "Men" 270 comprising male avatars 271 through 276. The user has selected female avatar 266 from "Females" 260, the selected female avatar 266 is displayed complete as full figure 280 and name "Nightclub-Female" 285. A limitation of the approach presented in avatar selection page 250 is that only 12 avatars are provided to the user for selection, which may not seem overly limiting to one user, but "Second Life" as of March 2008 had over 13 million registered users, and logged over 28 million hours of user time within the virtual reality environment. Distributing these users evenly amongst the avatars available results in approximately 1 million of each "Female" 261 through 266 and "Male" 271 through 276. It would be beneficial therefore to provide within the virtual environments the way of rapidly generating a wide variety of avatars either from the viewpoint of an avatar generator, such as the programmer in FIG. 1 for individual characters, crowds, etc., or users within their gaming environment such that they are personalized avatars and the variety of characters they engage within the virtual environments are varied and stimulating. Such an approach, which provides for the user generating the avatar to mimic, and simply adjust, weightings that occur within a genetically derived avatar generator that provides inheritance based development of an avatar is presented in respect of FIGS. 3 through 5. A screen view of such a three-generation inheritance based avatar generator 300 according to an embodiment of the invention for weighting grandparents for each parent and between parental families is shown in FIG. 3.

When employing the three-generation inheritance based avatar generator 300 a user selects four grandparents from a pool 310 of avatar characters, the pool 310 being larger than the 11 characters. In the three-generation inheritance based avatar generator 300 the avatar characters are "Rasta Jim" 311, "Rigelo" 312, "Rose" 313, "Steph" 314, "Timothy" 315, "Adrienne" 316, "Barbara" 317, "Charly" 318, "Eleonor" 319, "Hooly" 321, and "Lena" 322. Accordingly the user has selected "Steph" 314 as paternal grandfather 320, "Pam," not shown within pool 310 which is larger than that shown, as paternal grandmother 325, "Anthony", similarly not shown with displayed pool 310, as maternal grandfather 340, and "Eleonor" 319 as maternal grandmother 345. The terms maternal and paternal as employed within the embodiments are to differentiate the two sets of grandparents. As will be evident in respect of the embodiments the requirement for both sexes in the parents giving "birth" to the child within a software based inheritance based avatar generator is not necessarily a requirement, although optionally it may be set as one. The three-generation inheritance based avatar generator 300 therein generates the second generation comprising "Parent 1" 330, and "Parent 2" 350, and thereafter the third generation avatar "Off-Spring Head" 360 of "Parent 1" 330 and "Parent 2" 350. It would be apparent that three-generation inheritance based avatar generator 300 provides the user with an additional aspect of their game, if embedded within a game, allowing their avatar to be determined from a plurality of choices and inputs rather than a single click of a cursor over one image.

Figure 2B:
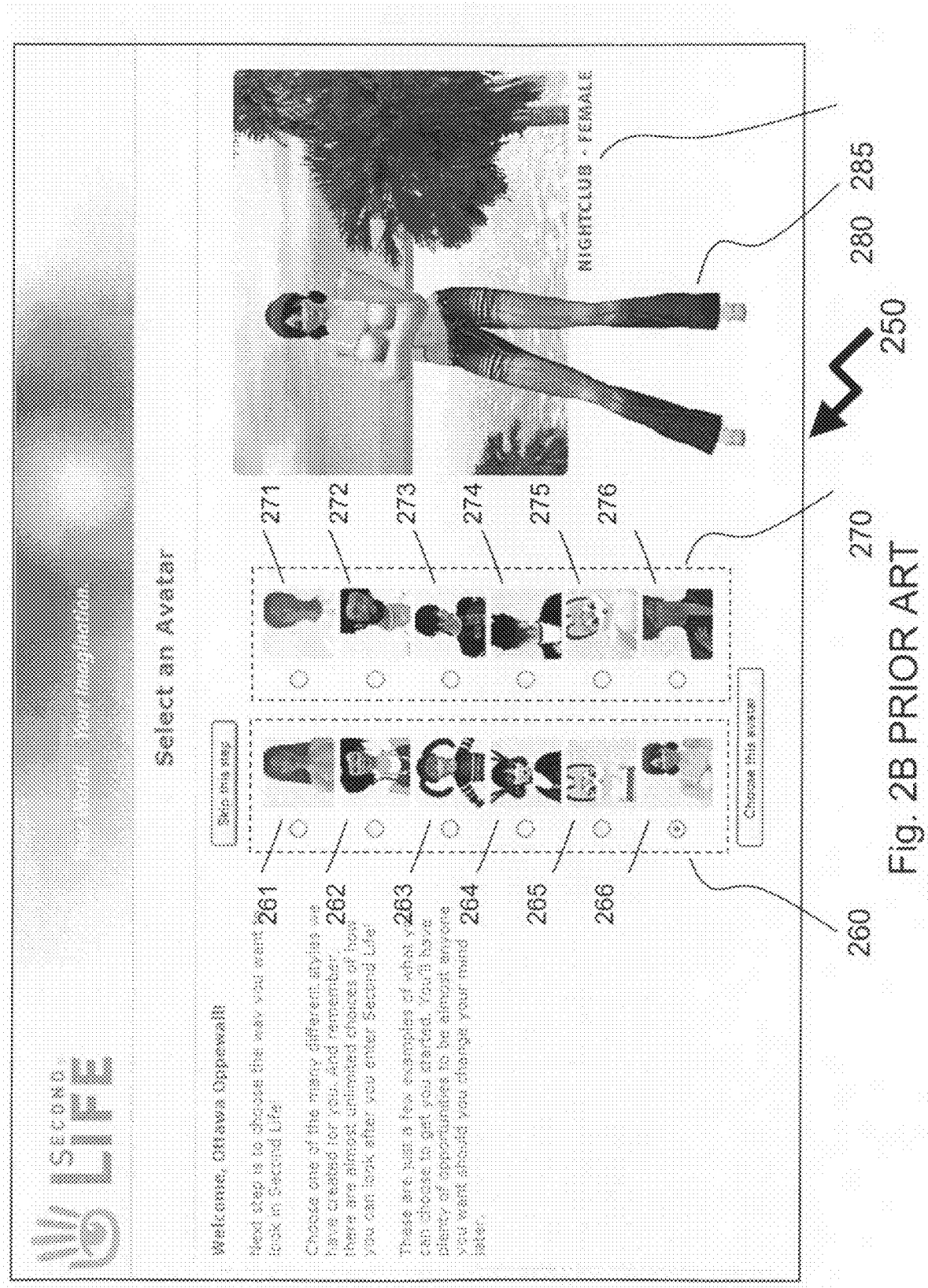
FIG. 2B illustrates a second user view of a prior art software package providing pre-generated avatars highlighting the predetermined features of each avatar.

Optionally, introducing the three-generation inheritance based avatar generator 300 into an online virtual reality environment such as "Second Life" as discussed supra in respect of FIG. 2B, allows for expansion of features such as allowing characters to procreate and have offspring, these offspring generated in accordance with predetermined or dynamically associated weightings from the environment, game status etc. Within the embodiment of the three-generation inheritance based avatar generator 300 the user is not required to select "male" characters for paternal grandfather 320 and maternal grandfather 340, and "female" characters for paternal grandmother 325 and maternal grandmother 345. Alternatively the three-generation inheritance based avatar generator 300 places limitations on the characteristics of the avatar characters, such as avatar characters 311 through 316, such as sex, relatives having predetermined relationships, ethnicity, or being human, of defined "alien" race etc.

Figure 3:
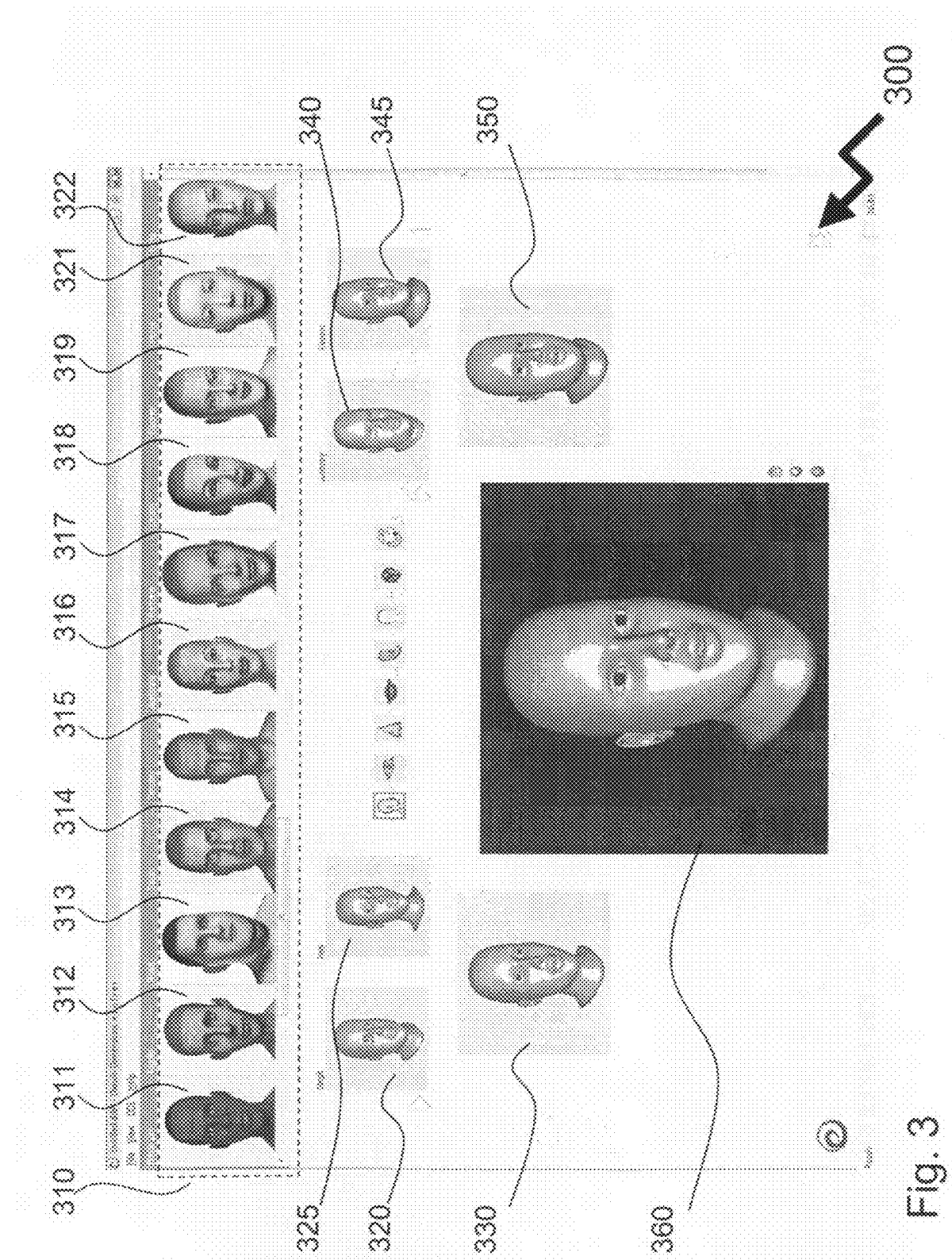
FIG. 3 illustrates an exemplary three-generation inheritance based avatar generator according to an embodiment of the invention for weighting grandparents for each parent and between parental families.
Figure 4:
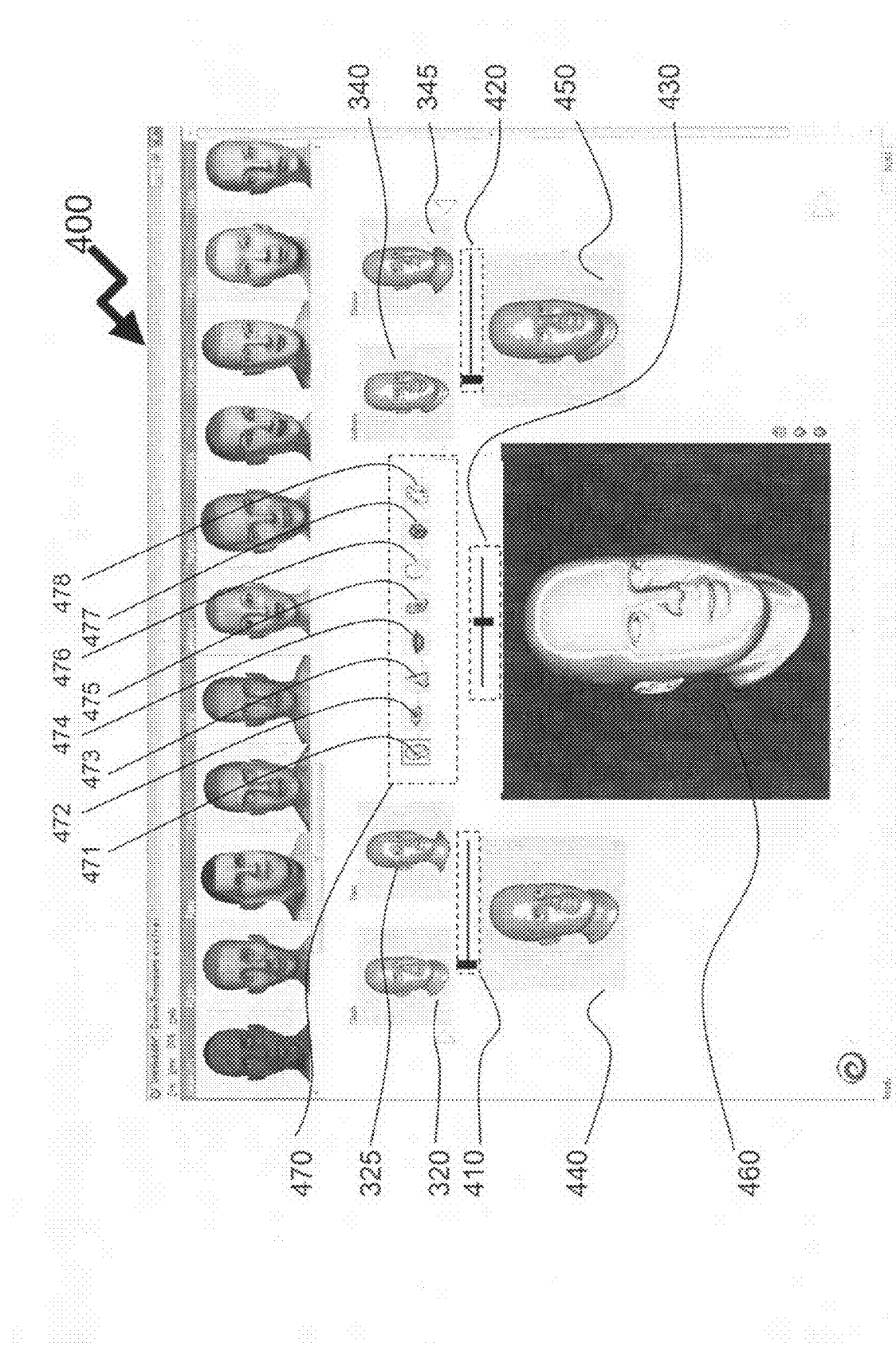
FIG. 4 illustrates further the exemplary three-generation inheritance based avatar generator of FIG. 3 highlighting the slider-bars providing alternate weighting, thereby favoring grandfathers.

Now referring to FIG. 4, illustrated is the three-generation inheritance based avatar generator 400, equivalent to three-generation inheritance based avatar generator 300 of FIG. 3, highlighting the slider-bars 410 through 430 according to the invention being set to an alternate weighting favoring grandfathers. As such within the three-generation inheritance based avatar generator 400 the avatar grandparents are "Steph" 314 as paternal grandfather 320, "Pam" not shown within pool 310 as paternal grandmother 325, "Anthony" similarly not shown with displayed pool 310 as maternal grandfather 340, and "Eleonor" 319 as maternal grandmother 345.

In the instant example, the user has moved the parental slider-bar 410 to its leftmost position, favoring the male grandparent "Steph" 314 on the parental side, resulting in "Weighted Parent 1" 440. Similarly, maternal slider-bar 420 has been set to its leftmost position, favoring maternal grandfather 340, the male grandparent "Anthony" on the maternal side, resulting in "Weighted Parent 2" 450. The three-generation inheritance based avatar generator 400 generates a weighted third generation avatar-off-spring 460 using "Weighted Parent 1" 440 and "Weighted Parent 2" 450. In generating the weighted third generation avatar-off-spring 460 the third generation inheritance based avatar generator 400 utilizes family weighting slide-bar 430, which is set slightly off to the maternal side, to adjust the weighting applied between "Weighted Parent 1" 440 and "Weighted Parent 2" 450.

Additional refinement of the avatar 460, once the grandparents and three sliders presented supra are defined, is possible via a feature selector bar 470 which is shown as comprising of eight feature icons 471 through 478. The first feature icon being "Whole Head" 471, when selected provides the global avatar modifications as discussed supra in respect of FIG. 3 and FIG. 4 to date, when used in combination with family weighting slide-bar 430. The second feature icon "Eyes" 472 provides refinement of the eyes of the off-spring 460 through use of the central slider 430. Third through sixth feature icons being "Nose" 473, "Mouth" 474, "Ear" 475, and "Cranium" 476, each of which is used in combination with the family weighting slide-bar 430. Seventh feature icon "Random" 477 provides a randomization of all grandparents with the sliders 410 through 430 maintained at the levels set manually by the avatar generator. Finally, eighth feature icon "Palette" 478 allows the avatar generator to change the skin palette of the off-spring 460 to that of any one of source characters within the pool 310. For example, "Rasta Jim" 311 is African American, "Rose" 313 is grey, and "Eleonor" 315 is Caucasian. Other avatars within the pool 310 may be colored blue, green etc. for alien species or even patterned such as zebra stripes. As such, simply by selecting the eighth feature icon "Palette" 478, the avatar generator is provided with a second window, not shown for clarity, showing the pool 310 allowing the avatar generator to select the character for the skin tone.

The three-generation inheritance based avatar generator of the exemplary embodiments presented in respect of FIGS. 3 through 4 for the head of the avatar is a first step, as the avatar generator would need to generate a body also. Such an exemplary second step is shown in the three-generation inheritance based avatar generator 500. Now shown to the avatar generator is the pool 510, but now each body is shown in full modesty level nudity. As such, shown are "Rasta Jim" 511, "Rigelo" 512, "Rose" 513, "Steph" 514, "Timothy" 515, "Adrienne" 516, "Barbara" 517, "Charly" 518, "Eleonor" 519, "Hooly" 521, and "Lena" 522, wherein again the avatar grandparents are "Steph" 514 as paternal grandfather 520, "Pam" as paternal grandmother 525, "Anthony" 512 as maternal grandfather 540, and "Eleonor" as maternal grandmother 545. These give rise to "Body Parent 1" 530 and "Body Parent 2" 550 in the second generation and "Off-Spring" 560, in the same manner as presented supra, using "Body Paternal Slider" 582, "Body Maternal Slider" 586 and "Body Weighting Slider" 584.

Also shown are "Body Slider" 578 and three body feature icons, "Head-Body Ratio" 572, "Scale Neck" 574, and "Height" 576. The avatar generator in selecting "Height" 576 can scale the whole body of "Off-Spring" 560 across the pre-determined range defined in conjunction with the "Body Slider" 578, for example from 0.4 m (approximately 16 inches) for an infant through to 2.4 m (approximately 7 feet 10 inches). Similarly, "Scale Neck" 574 allows the avatar generator to adjust the length of the neck of "Off-Spring" 560, and "Head-Body Ratio" 572.

Figure 5:
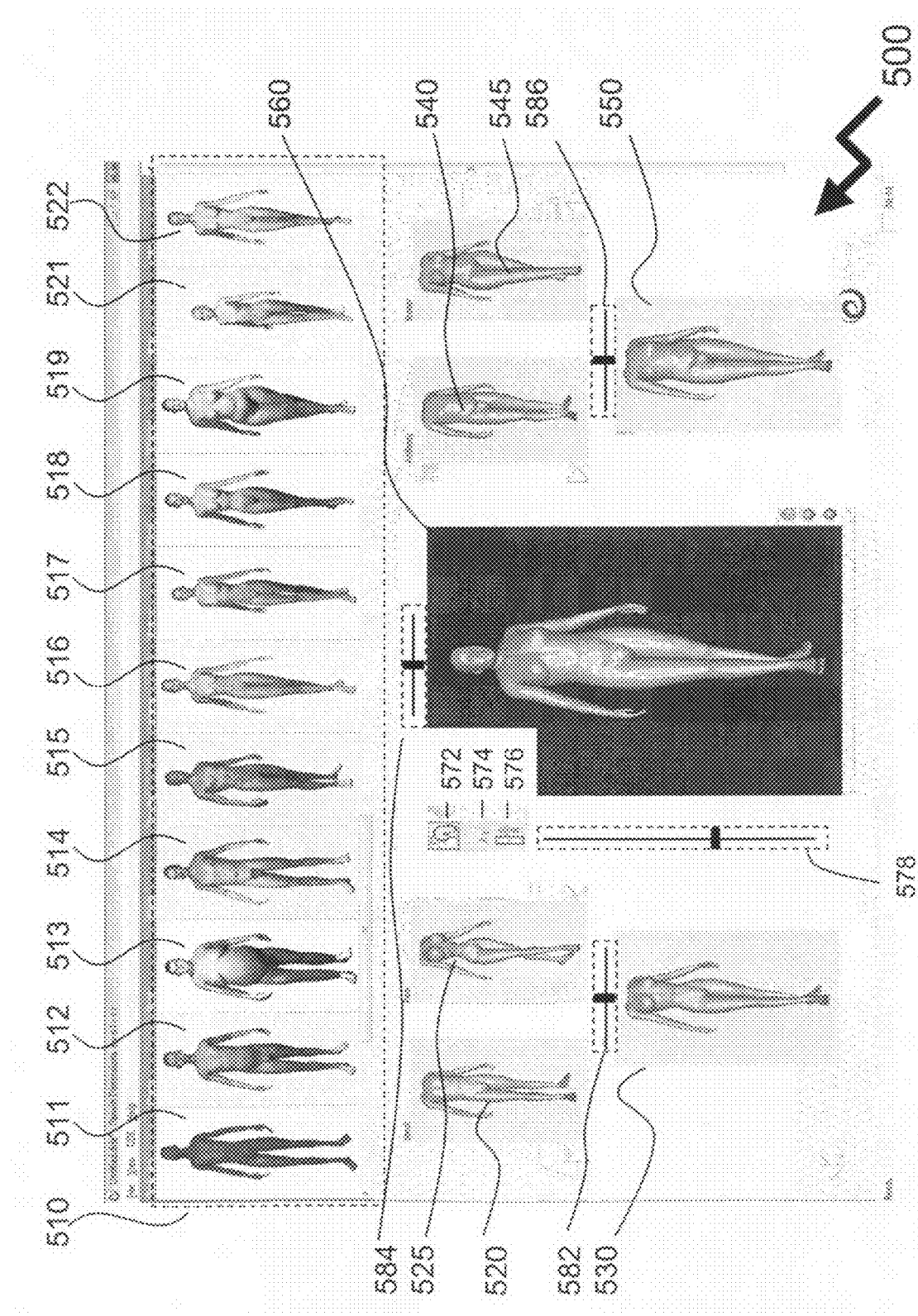
FIG. 5 illustrates the exemplary three-generation inheritance based avatar generator of FIG. 3 for a second step of the body generation.
Figure 6:
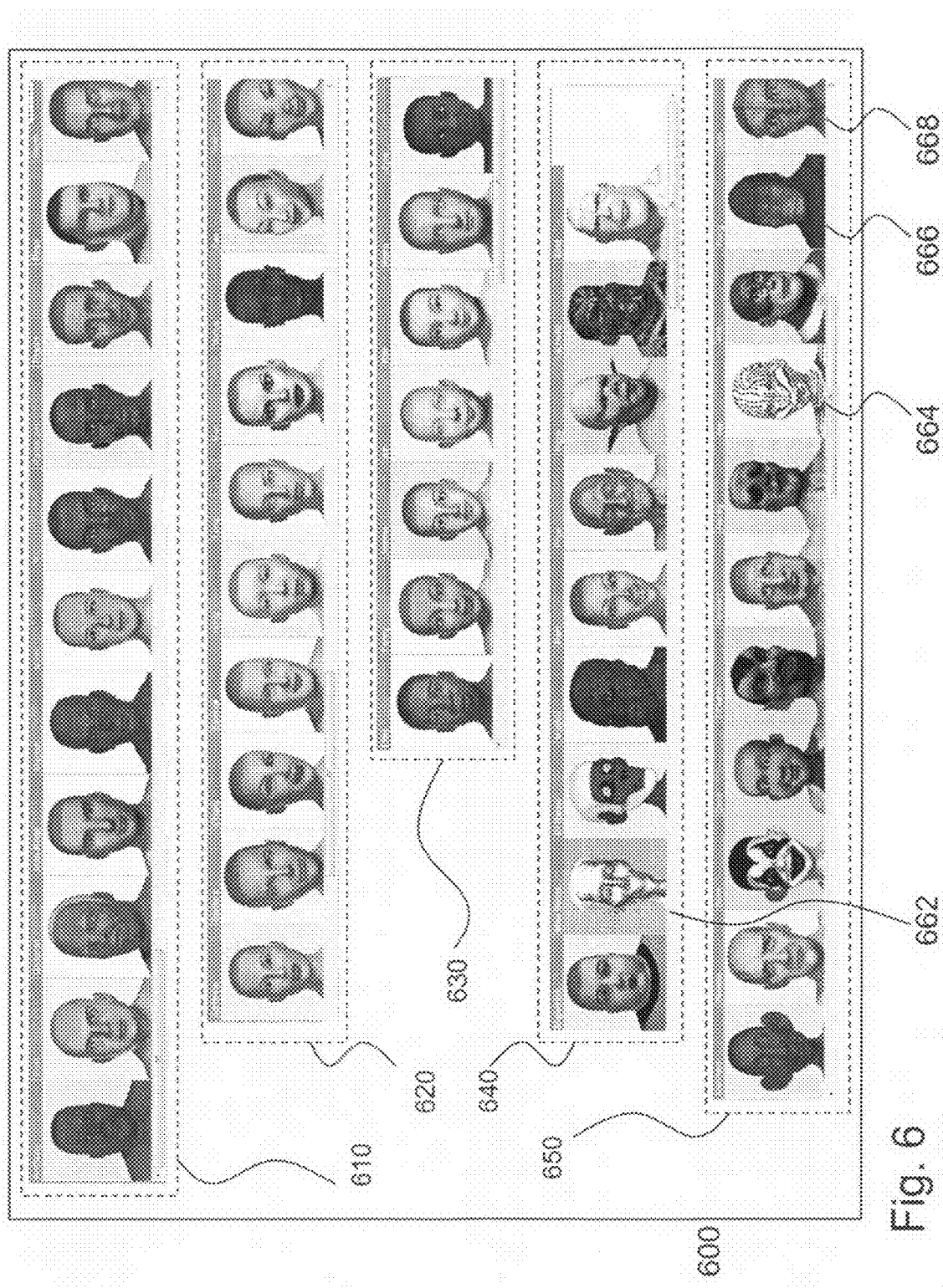
FIG. 6 illustrates exemplary male, female, and fantasy avatars as possible grandparent choices within the exemplary three-generation inheritance based avatar generator of FIG. 3.

Referring now to FIG. 6, a complete pool 600 is shown in order to show the breadth of avatar characters. In respect of the previous FIGS. 3 through 5 the screen view presented to the user shows 11 avatars and scrolling left or right would scroll through the complete pool 600 for the user. As such, the complete pool 600 comprises a first group 610 of avatars with human male characteristics, a second group 620 with human female characteristics, third group 630 of human youth, first non-human group 640, and second non-human group 650. Examples of avatars offering substantial variations away from human characteristics in the avatar generator, such as the three-generation inheritance based avatar generator 500 of FIG. 5, are "Miss Bones" 662 with metallic body coloration, "Ilsa" 664 with zebra body coloration, "Kong" 666 with ape characteristics, and "Lilith" 668 providing alien facial characteristics and body (not shown to clarity) with green body coloration.

Figure 7:
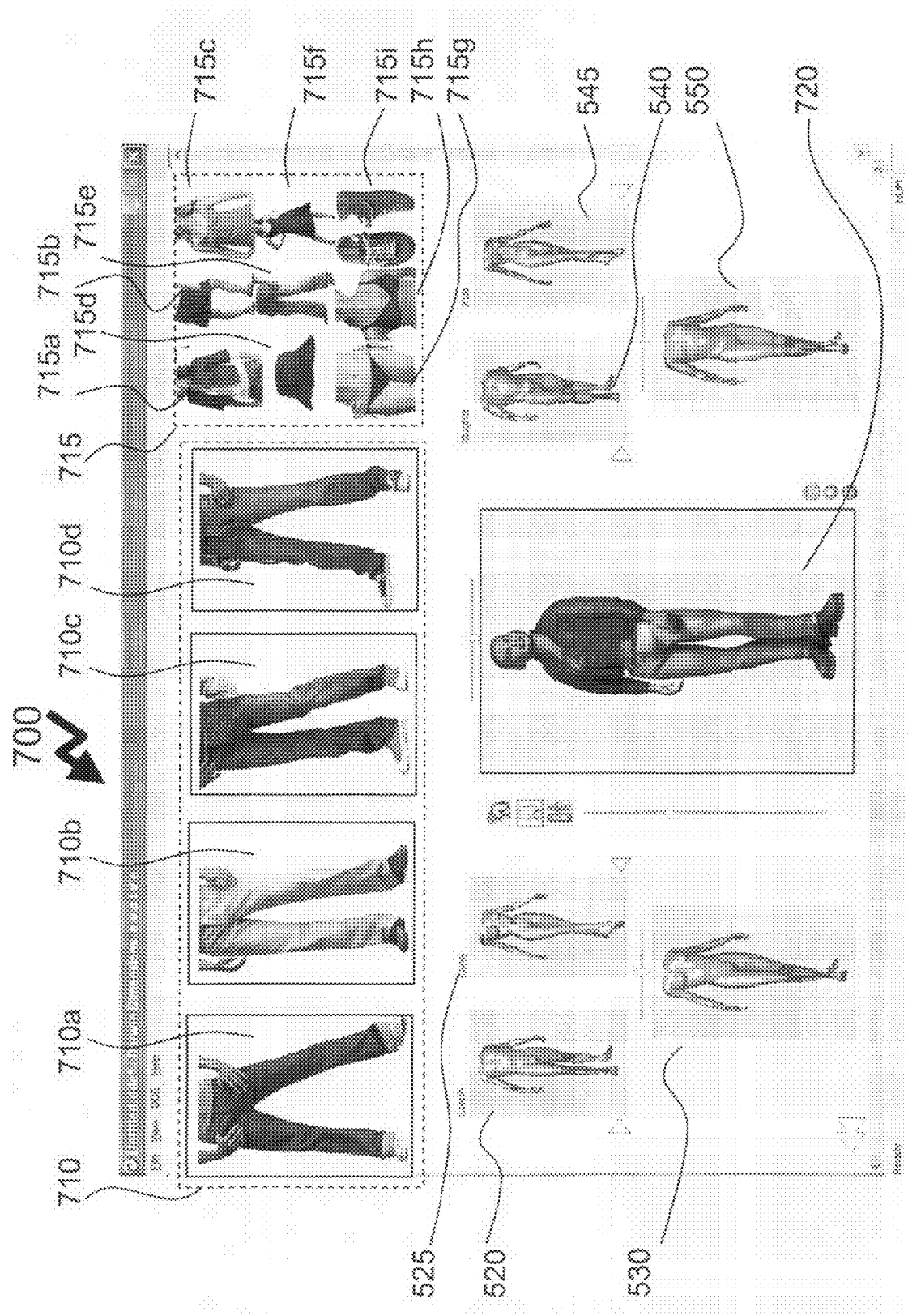
FIG. 7 illustrates an exemplary third step of selecting non-physical features of an avatar during their generation.

Now referring to FIG. 7, illustrated is a three-generation inheritance based avatar generator 700 illustrating the third step of providing non-physical features of the avatar. Accordingly shown are aspects from the second step of the body generation, such as shown supra in respect of FIG. 5, and the non-physical feature selection aspects comprising non-physical feature selector 715 and option bar 710 for the selected feature within non-physical feature selector 715. As such the bodies of the "Steph" 314 as paternal grandfather 520, "Lena" 322 as paternal grandmother 525, "MugNa" (not shown in pool of avatars) as maternal grandfather 540, and "Xua" (also not shown in pool of avatars) as maternal grandmother 545. These are shown together with "Body Parent 1" 530 and "Body Parent 2" 550 in the second generation. However, the torso of "Off-Spring" 560 has now been replaced by the full avatar body 720 with previously and currently selected non-physical features. As such the full avatar body 720, without any non-physical feature selections would comprise torso from the second stage body step, described supra in respect of FIG. 5, and the first stage head step, as described supra in respect of FIG. 3.

Accordingly the avatar animator is provided with non-physical feature selector 715, which comprises a series of icons 715a through 715i relating to categories of non-physical features. As shown, the icons relate to clothing for a female avatar and are "Jacket" 715a, "Skirt" 715b, "Blouse" 715c, "Hat" 715d, "Trousers" 715e, "Dress" 715f, "Lingerie" 715g, "Bra" 715h, and "Shoes" 715i. In the instant example, the user has selected "Trousers" 715e. When one of icons relating to clothing is selected the option bar 710 displays all, or optionally a sub-set, of the variants for that item of clothing available to the user for selection. In this view of the three-generation inheritance based avatar generator 700 the option bar 710 displays "Jeans—Standard" 710a, "Curvy Low Rise" 710b, "Pants—Tight" 710c, and "Jeans—Boot Cut" 710d.

In selecting each category of non-physical features, from non-physical feature selector 715, and specific option from option bar 710, the full body avatar 720 is re-displayed with the selected item. Importantly, the three-generation inheritance based avatar generator 700 automatically resizes and maps the selected item, such as Jeans-Standard" 710a to the full body torso (being full body avatar 720 without any additional features). In this manner an adjustment in the full body avatar 720 arising from a change in the multiple selections the avatar generator can make, including paternal grandparents 320 and 325, maternal grandparents 340 and 345, paternal grandparent weighting via paternal slider 410, maternal grandparent weighting via maternal slider 420, father-mother weighting via family weighting slide-bar 430, and the eight feature icons 471 through 478, results in the automatic mapping of the selected non-physical features to the new avatar.

Optionally, the non-physical features displayed to the user in option bar 710 arising from selection of an element within the non-physical feature selector 715 may be items selected by the user from an online catalogue, rather than predetermined options. Alternatively, they may form part of a wardrobe that is procured by the user during the course of their activities within the virtual environment, such as virtual shopping within a virtual mall for example. Accordingly the third step of mapping non-physical features may be decoupled from the avatar generator and accessible to the user during normal interaction with the virtual environment allowing them to adjust the clothing and other non-physical features according to the environment within which the user is currently engaging. For example within Second Life® the users clothing may be formal dress within the "Capitol Hill" environment and casual beachwear within "HealthInfo Island".

Figure 8:
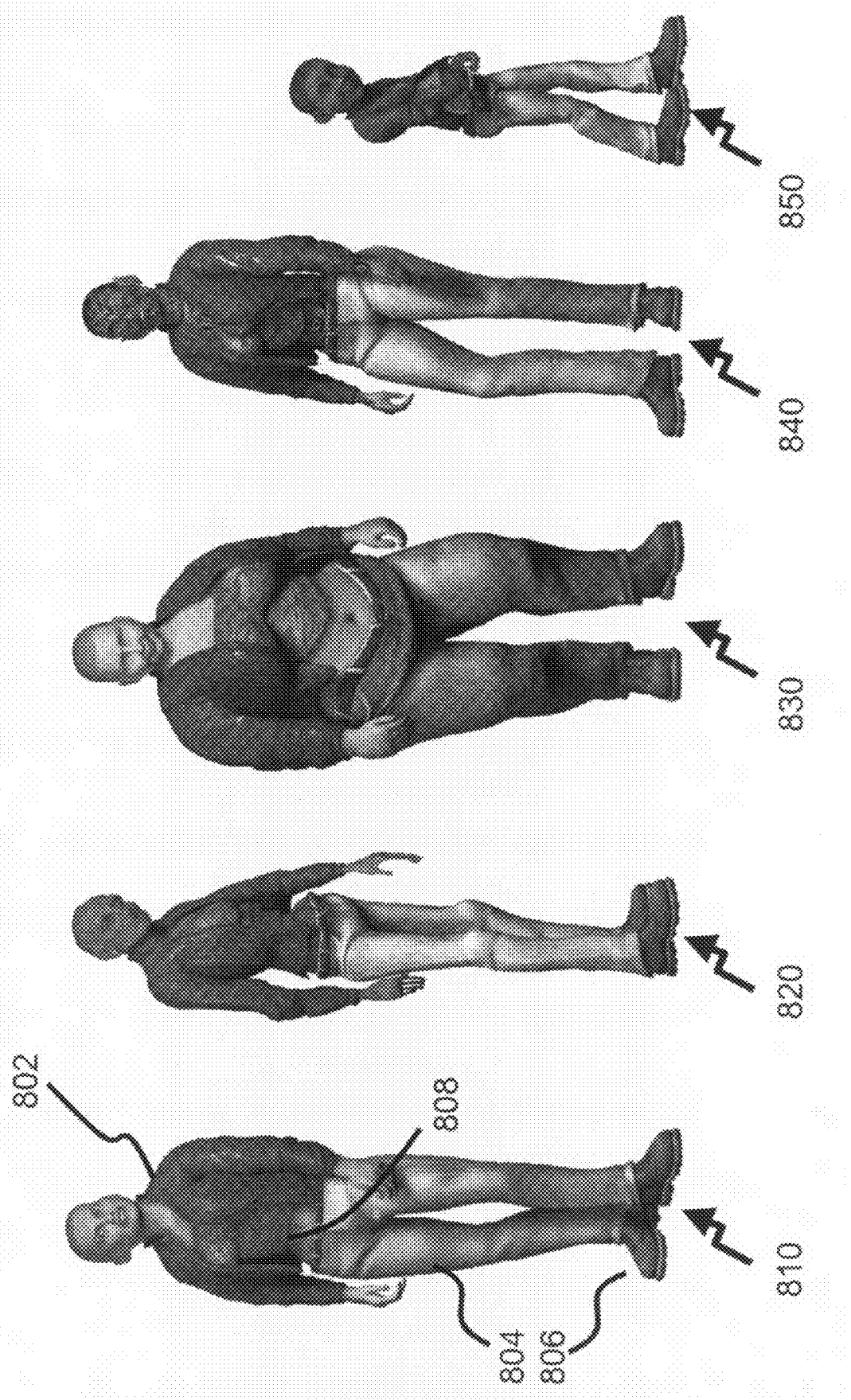
FIG. 8 illustrates exemplary avatars generated according to the exemplary three-generation inheritance embodiment of the invention wherein the selected non-physical features are automatically mapped to the adjustments in the avatar from the first and second steps relating to the physical characteristics.

In this manner, as illustrated in FIG. 8, the three-generation inheritance based avatar generator output automatically maps these non-physical features to the adjustments in the avatar from the first and second steps relating to the physical characteristics, which can be substantial changes in the avatar given the selections and weightings the avatar generator can make. As shown within FIG. 8 the non-physical features comprise "Blue Denim Jacket" 802, selected with non-physical feature selector 715 icon "Jacket 715a" and appropriate option from option bar 710, "Washed Blue Jeans" 804 using icon "Trousers" 715e, "Brown Boots" 806 using icon "Shoes" 715i, and "Camouflage Tank" 808 using icon "Blouse" 715c. Avatars employing these non-physical features 802 through 808 automatically mapped to their torsos are "Human Female" 810, "Old Alien Male" 820, "Big Woman" 830, "Alien Female" 840, and "Boy" 850.

In this manner, according to an embodiment of the invention, the selection of non-physical features genuinely is a "one-size-fits-all" selection of clothing or other elements provided within the option bar 710 and routed through non-physical feature selector 715. Optionally, each non-physical feature may be provided with a palette change, as discussed supra in respect of the skin tone of the off-spring 460 using "Palette" 478 in respect of FIG. 4. In this manner, non-physical feature selector 715 and option bar 710 optionally provide for selection of styles, shapes, or other aspects of non-physical features which are then adjusted in relation of a palette feature in color, pattern etc. Aspects of the full body avatar 720 arising from lighting, posture, etc. are provided by subsequent processing in respect of the animations applied to the avatar generated.

In the embodiments of the invention presented supra the inheritance based avatar generation process has been presented in respect of a human procreation model with two parents for each off-spring and weighting applied between each pair of parents within each of the first and second generations giving rise to the third generation. Whilst the weightings applied have been discussed in respect of slider bars it would be apparent that alternative methods of user selection of the weighting are possible, including implementations of dials, knobs, etc. and entry by the user of a percentage, ratio or other indicator.

Optionally, the inheritance based avatar generator may be implemented with N parents, wherein N>2, for each offspring, and a weighting $W_m$ is provided by the user for all but one parent, i.e. providing N−1 weightings, where $$\sum_{m=1}^{N} W_m = 1.$$

The final weighting being automatically calculated. Alternatively the user may also be provided with a random weighting function, wherein a pseudo-random number generator provides the weightings for the current selection of parents. It would also be apparent that the avatar generator may select any combination of parents, and hence whilst the embodiments supra employ human, or humanoid, parents such a limitation is only for ease of presentation and understanding. No such limitation exists for the avatar generator other than the avatars within the pool have formats compatible with the inheritance based avatar generator process.

Figure 9:
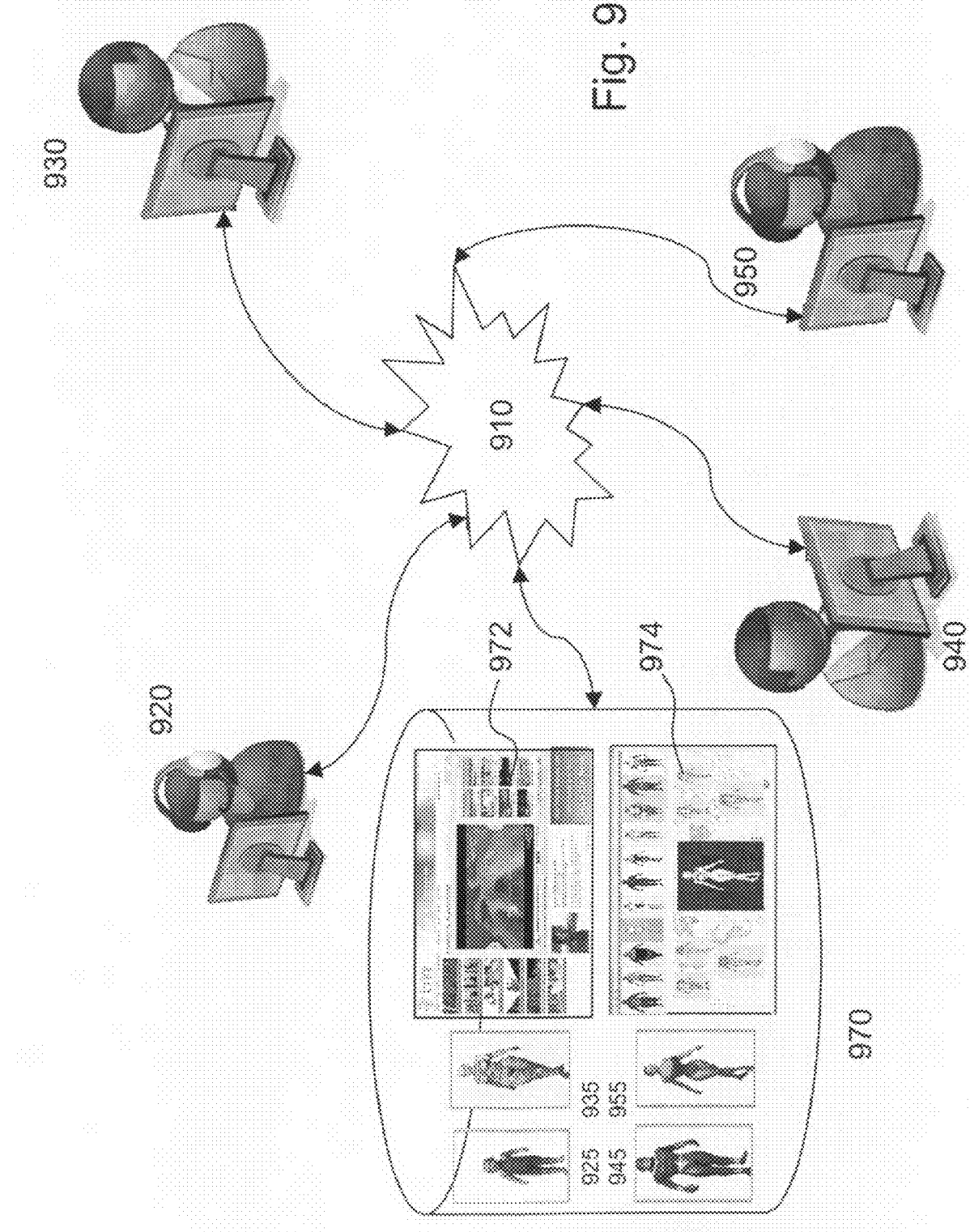
FIG. 9 illustrates an online virtual environment configuration wherein the avatars are stored at a centralized server.

Now having generated their avatar the user now wishes to use them within the virtual environment or virtual environments they access. Accordingly, shown in FIG. 9 is an avatar creation scenario employing a three-generation avatar generator 974, such as for example the three-generation inheritance based avatar generator 500. As shown, the three-generation avatar generator 974 is hosted upon a server 970 and is associated with a virtual environment 972. The server 970 being connected to a network 910, such as the World Wide Web or Internet, and thereupon to users 920 through 950. Each of the users 920 through 950 creates a user account within the virtual environment 972 and thereby executes the three-generation avatar generator 974 to generate their character, which is stored within the server 970. First user 920 generates "Boy" 925, second user 930 generates "Zebra Girl" 935, third user 940 generates "Superhero" 945, and fourth user 950 generates "Vixen" 955.

Figure 10:
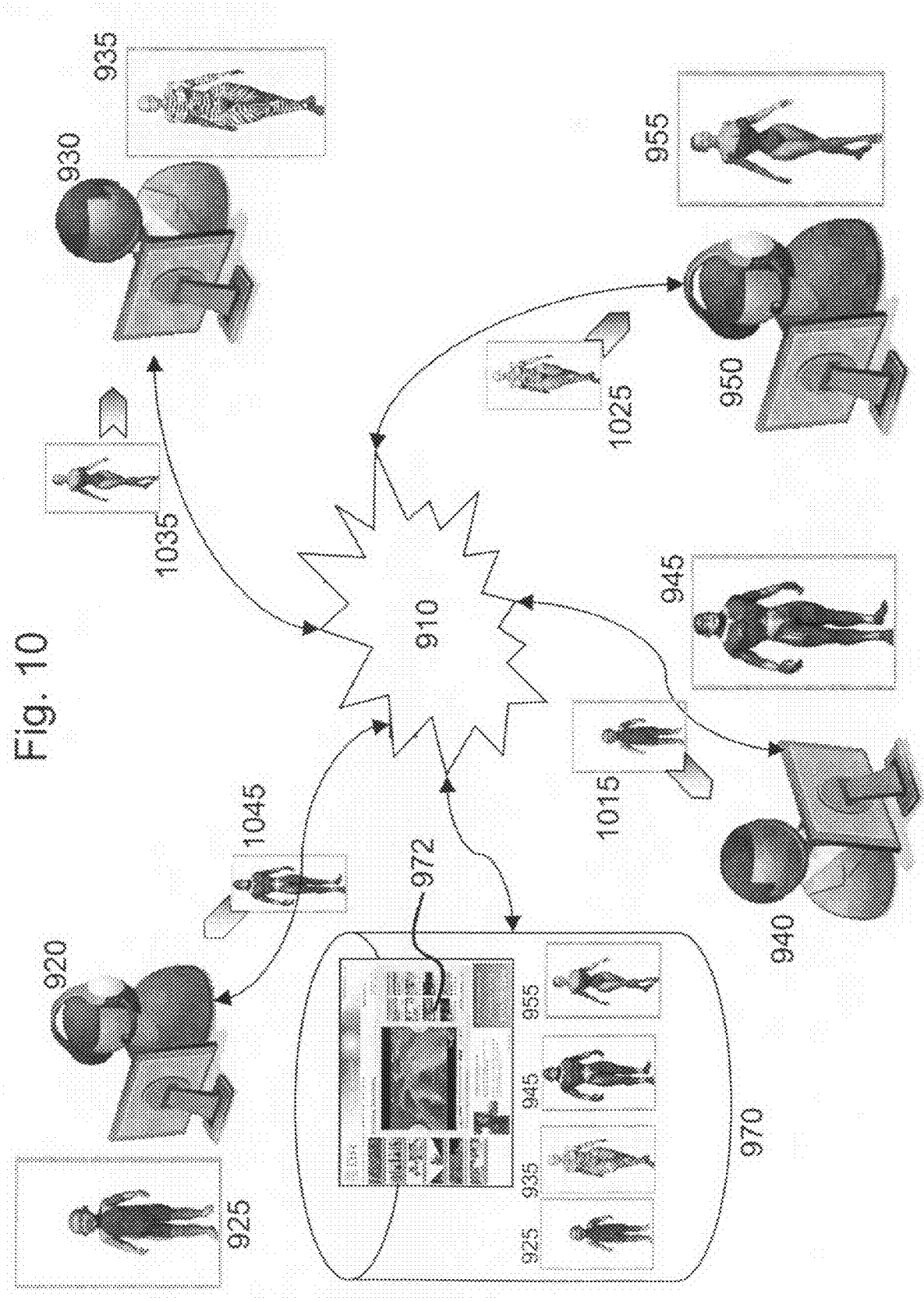
FIG. 10 illustrates data transfer aspects of the online virtual environment configuration of FIG. 9 in provisioning data relating to avatars engaging the user's avatar.

Now the users 920 through 950 enter the virtual environment 972 and begin interacting within it, as is shown diagrammatically within FIG. 10. Accordingly first user 920 walks into a room, not shown for clarity, within which is third user 940. The virtual environment 972 therefore must present the first user's avatar "Boy" 925 to the third user 940 and the third user's avatar "Superhero" 945 to the first user 920. Accordingly the virtual environment 972 extracts "Boy" 925 from the server 970 and transmits this to the third user 940 via the network 910 as Boy Character File 1015. The virtual environment 972 also extracts "Superhero" 945 from the server 970 and transmits this to the first user 920 via the network 910 as Superhero Character File 1045

Meanwhile second user 920 within the virtual environment has their character "Zebra Girl" 935 enter a taxi, not shown for clarity, which is being driven by "Vixen" 955 being the avatar of the fourth user 950. The virtual environment 972 therefore must present the second user's avatar "Zebra Girl" 935 to the fourth user 950 and the fourth user's avatar "Vixen" 955 to the second user 930. Accordingly the virtual environment 972 extracts "Zebra Girl" 935 from the server 970 and transmits this to the fourth user 950 via the network 910 as Zebra Girl Character File 1025. The virtual environment 972 also extracts "Vixen" 955 from the server 970 and transmits this to the second user 930 via the network 910 as Vixen Character File 1035. Hence each Character File transferred to each user is a file of several Mb of data when the virtual environment 972 presents realistic representations to the users 920 to 950.

Hence transferring even one character to display to a user may take several minutes. For example a 5 Mb file will take approximately 5 minutes 30 seconds at a transfer rate of 128 Kbps which is representative of good high speed residential service, and approximately 30 seconds with a dedicated 1.544 Mbps T1 connection as employed by many small businesses. It is for this reason that virtual environments such as Second Life today employ coarse avatars to reduce Character File sizes. However, user demand is for increased reality, avatars with individual characteristics etc. which all result in increased Character File sizes. These issues are significant with even one high resolution avatar, and are exacerbated when the user is moving within the environment, as they will encounter other avatars for short periods perhaps as they walk towards one another and pass for example, or the user enters an environment with many avatars present such as a restaurant, dance floor, etc.

Figure 11:
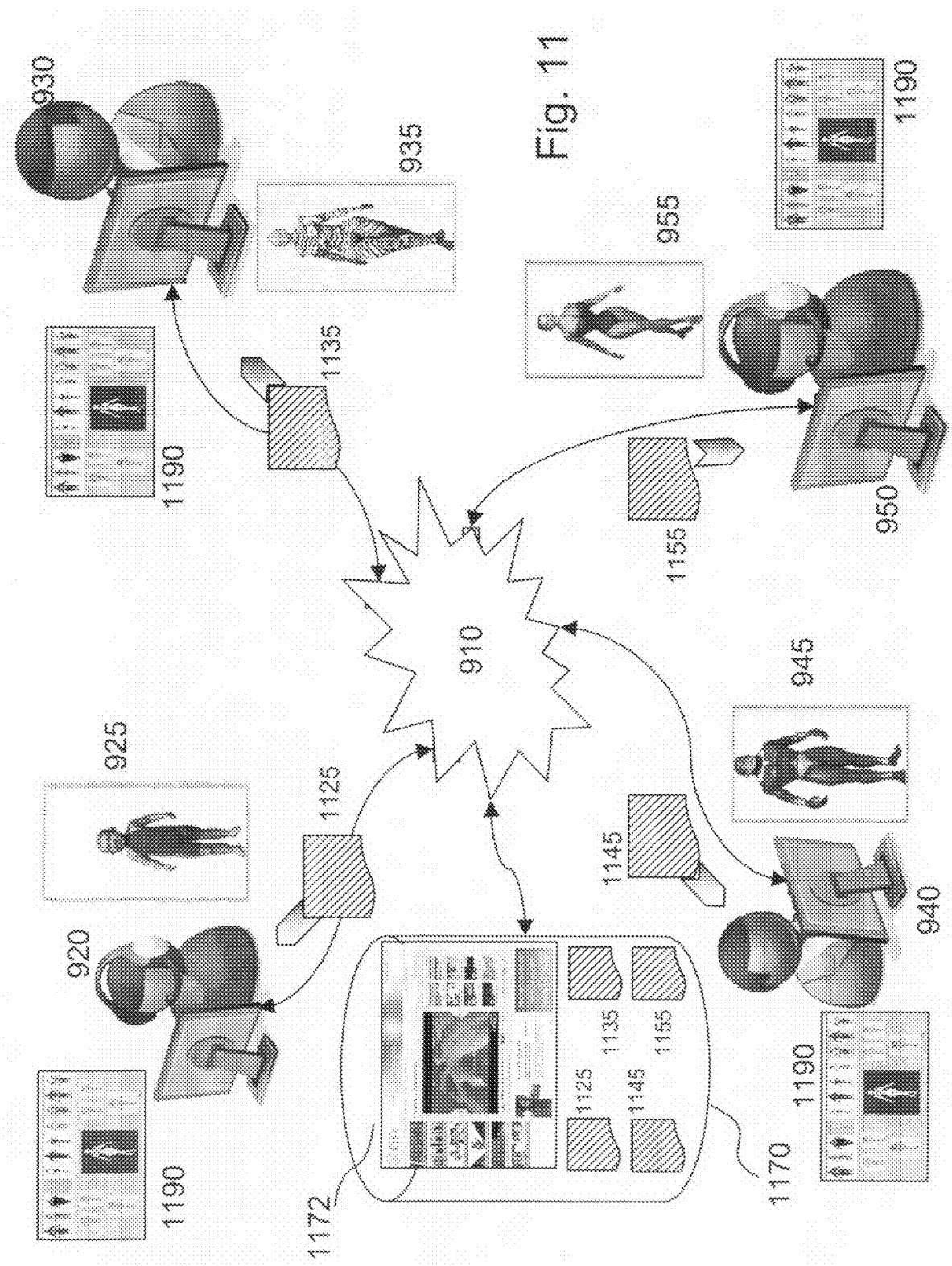
FIG. 11 illustrates an exemplary embodiment of an online environment according to the invention with local user character generation.

Referring to FIG. 11 there is shown an exemplary network according to an embodiment of the invention. Users 920 through 950 are interconnected via a network 910 to server 1170, which is hosting virtual environment 1172. Each of the users 920 through 950, upon registering with the virtual environment 1172, downloads environment software suite, not shown, which includes a three-generation inheritance based avatar generator 1190 that the users employ to generate their avatars. Accordingly first user 920 generates "Boy" 925, second user 930 generates "Zebra Girl" 935, third user 940 generates "Superhero" 945, and fourth user 950 generates "Vixen" 955. Upon completion of each avatar, a Character DNA File relating thereto is transferred to server 1170 from the computer system of the associated user.

Hence, first user 920 upon completing the generation of "Boy" 925 triggers the sending of Boy DNA File 1125 to the server 1170. Similarly, second user 930 triggers the transmission of Zebra Girl DNA File 1135 to the server 1170. Third user 940 upon completing the generation of their avatar with the three-generation inheritance based avatar generator 1190 sends Superhero DNA File 1145 to the server 1170, and fourth user 950 sends Vixen DNA File 1155.

Figure 12:
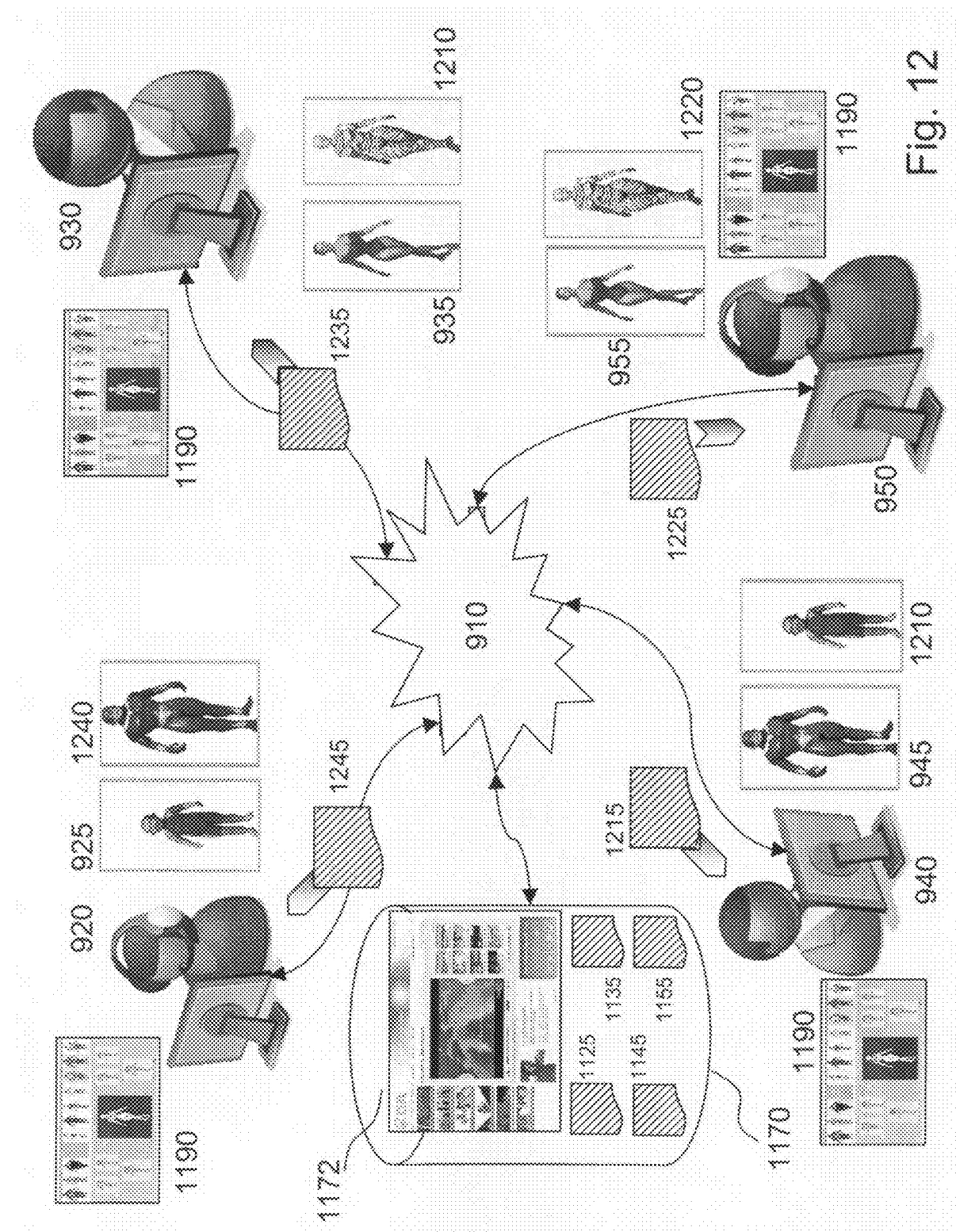
FIG. 12 illustrates an exemplary embodiment of the provisioning of data relating to avatars engaging the user's avatar according to the online virtual environment of FIG. 11; and, FIG. 13 illustrates an exemplary embodiment of a DNA metadata file transferred to a user in respect of generating an avatar engaging their avatar according to the online virtual environment of FIG. 11.

Now the users 920 through 950 enter the virtual environment 1172 and begin interacting within it, as shown within FIG. 12. Accordingly first user 920 walks into a room, not shown for clarity, within which is third user 940. The virtual environment 1172 therefore must present the first user's avatar "Boy" 925 to the third user 940 and the third user's avatar "Superhero" 945 to the first user 920. Accordingly the virtual environment 1172 extracts Boy DNA File 1125 and transmits this to the third user 940 via the network 910 as Released Boy DNA File 1215. Receipt of Released Boy DNA File 1215 by the environment software suite triggers the three-generation inheritance based avatar generator 1190 to generate within the virtual environment that is seen by third user 940 the avatar "Boy" 925. The virtual environment 1172 also extracts Superhero DNA File 1145 from the server 1170 and transmits this to the first user 920 via the network 910 as Released Superhero DNA File 1245. Receipt of Released Superhero DNA File 1245 by the environment software suite triggers the three-generation inheritance based avatar generator 1190 to generate within the virtual environment that is seen by first user 940 the avatar "Superhero" 945.

Meanwhile second user 930 within the virtual environment has their character "Zebra Girl" 935 enter a taxi, not shown for clarity, which is being driven by "Vixen" 955 being the avatar of the fourth user 950. The virtual environment 1172 therefore must present the second user's avatar "Zebra Girl" 935 to the fourth user 950 and the fourth user's avatar "Vixen" 955 to the second user 930. Accordingly the virtual environment 1172 extracts Zebra Girl DNA File 1135 and transmits this to the fourth user 950 via the network 910 as Released Zebra Girl DNA File 1225. Receipt of Released Zebra Girl DNA File 1225 by the environment software suite triggers the three-generation inheritance based avatar generator 1190 to generate within the virtual environment seen by fourth user 950 the avatar "Zebra Girl" 935. The virtual environment 1172 also extracts Vixen DNA File 1155 from the server 1170 and transmits this to the second user 930 via the network 910 as Released Vixen DNA File 1235. Receipt of Released Vixen DNA File 1235 by the environment software suite triggers the three-generation inheritance based avatar generator 1190 to generate within the virtual environment seen by second user 930 the avatar "Vixen" 935.

As a result, the transfer from the virtual environment to any of the users 920 through 950 is a DNA File, such as Released Vixen DNA File 1235. The DNA File contains only the information that is necessary for the three-generation inheritance based avatar generator 1190 to generate the avatar. Referring back to FIGS. 3 through 8 it is evident that this is a relatively small amount of data. Considering the first step of the avatar generation described with reference to FIGS. 3 and 4, then 14 terms outlined in Table 1 are sufficient to capture the first step:

TABLE 1

Head Generator Parameters

| | |
|---|---|
| Paternal Grandfather 320 | Head Slider 471 |
| Paternal Grandmother 325 | Eye Slider 472 |
| Maternal Grandfather 340 | Nose 473 |
| Maternal Grandmother 345 | Mouth 474 |
| Paternal Slider 410 | Ear 475 |
| Maternal Slider 420 | Cranium 476 |
| Family Weighting Slider 430 | Color Source 478 |

Next, the second step of generating the body may be described with the parameters outlined below in Table 2.

TABLE 2

Body Generator Parameters

| | |
|---|---|
| Paternal Grandfather 520 | Head Ratio Setting 572 |
| Paternal Grandmother 525 | Neck Setting 574 |
| Maternal Grandfather 540 | Height Setting 576 |
| Maternal Grandmother 545 | |
| Paternal Slider 582 | |
| Maternal Slider 586 | |
| Family Weighting Slider 584 | |

Hence with the 24 parameters specified within Tables 1 and 2 it is possible to generate the users avatar, albeit without non-physical features. Such non-physical features may then be added to this data and thereby describe all aspects of the users avatar, when entered into a three-generation inheritance based avatar generator such as that described supra. An outline file structure for a DNA File, such as Vixen DNA File 1155, is depicted in FIG. 13 by file outline 1300. Within file outline 1300 the data representing the user's avatar is provided within a series of data blocks 1310 through 1370. Considering the first data block 1310 this contains information relating to the user, such as their identity and nickname. This block optionally may contain other information relating to the user such as language preference, account information, membership information and verified date of birth.

The second data block 1320 contains information relating to the avatar's history such as date of creation and date of last modification. Additionally, information relating to limits of the avatar within the virtual environment may be contained within the DNA File. Optionally the avatar may during its "life" within the virtual environment gain additional non-physical features, such as tattoos or piercings, or even potentially physical attributes, such as breast augmentation or reduction. The history of these events may optionally be stored.

Next within the third data block 1330 there is stored data relating to the generation of the head for the avatar, the data being at least that outlined supra in Table 1 in respect to the identities of the four grandparents, the weighting between the pairs to generate the parents, and the parental weighting. Similarly the data within the fourth data block 1350 relates to the generation of the body of the avatar as discussed supra in respect of Table 2, and additionally includes the identification of the source avatar for the color of the generated avatar.

Referring to the fifth data block 1370 the data relates to the other aspects of the body and head generation steps such as neck, height, eye position, nose etc. Additionally the fifth data block 1370 contains information regarding hairstyle and beard. Optionally it may include hair color as determined from a selection of the user at the time of the avatar generation or subsequently from the activities of the avatar within the virtual environment, such as visiting a hairdresser for example.

Sixth data block 1340 contains data relating to non-physical features of the avatar. Such attributes including within this example contact lenses, which if present may be colored, glasses, jewelry, tattoos and ear piercing. Optionally this may include all piercings, including some evident only in adult themed avatars and adult only virtual environments. The seventh data block 1360 relates to non-physical features as discussed supra in respect of FIG. 7 in the selection of clothing such as shirt/blouse, trousers, footwear etc. Optionally the clothing items may be extended to include lingerie or even multiple selections for each category so that the DNA File contains essentially the entire wardrobe of the avatar.

Advantageously, a Character DNA File such as Vixen DNA File 1155, will typically be only several tens of kilobytes rather than the several megabytes of the prior art approaches. Using the exemplary bandwidths supra then even for a DNA File of 100 Kb, the transfer time would be approximately 6.5 seconds for the high speed residential service and approximately 0.5 seconds for the 1.544 Mbps T1 dedicated line. As a result the user within the virtual environment would experience very rapid adjustments in their view of the virtual environment as they see new avatars and these are generated using the local three-generation inheritance based avatar generator 1190.

It will be evident that, with the ability to rapidly transfer information relating to an avatar to be displayed to a user, the virtual environment can exploit this to provide increased speed of response to user actions within a virtual environment. For example, the user enters a building with two doors, behind each of which are 5 other players within the virtual environment. According to the prior art the virtual environment due to speed/response constraints would wait for the user's decision before deciding which group of 5 avatars should be downloaded. Now the virtual environment can load all ten avatars DNA files quickly and be ready with either option at the point the user decides.

In respect of the embodiments presented supra the DNA File containing the metadata has been described as a single data file stored upon a server associated with the virtual environment. Alternatively the DNA File may be split into two or more sections and stored upon a single computer system or multiple computer systems. For example, the DNA File may be split into two predetermined portions, the first addressing all of the physical characteristics of the avatar and the second addressing the non-physical feature, such as clothing, jewelry etc. These portions may be hosted on the same computer system or different computer systems. As a non-limiting example, the portion determining physical characteristics is stored upon a server associated with the virtual environment at the creation of the avatar, and the second portion determining non-physical feature is stored on a computer system associated with the owner of the avatar. These non-physical features may be initially set with the creation of the avatar, but later modified over the life of the avatar as events unfold within the virtual environment such as fights leading to scars, decisions to have a tattoo, purchasing of clothing or jewelry, etc. Alternatively the first or second portions may be stored on servers, which are not hosting the virtual environment, but which are perhaps global avatar providers such that the avatar of a particular player can be provided to any virtual environment that the player wishes to explore.

Optionally the second portion of the DNA File is selected from a plurality of second portions, for example the avatar has associated with it several outfits, and the selection of an outfit determining which second portion is provided in combination with the first portion. The selection optionally is made by a user associated with the avatar or alternatively is determined in dependence upon a characteristic of the user to whom the DNA File is sent, such as for instance a state of the virtual environment from the perspective of the user to whom the DNA file is sent. For instance, if the avatar of a user to which the DNA File is sent currently is within a beach theme of a virtual environment, then the avatar generated using the DNA File is automatically provided with a beach appropriate outfit. Alternatively, if the current theme of the virtual environment relates to a dinner engagement then a dinner dress outfit is selected. Alternatively, if the current theme of the virtual environment relates to a bath, then no clothing is provided for the avatar or the avatar is provided with a towel, a bathrobe, etc.

Numerous other embodiments may be envisaged without departing from the spirit or scope of the invention.

What is claimed is:

1. A method comprising:
using an avatar generator process that is in execution on a first computer system associated with a first user, generating an avatar as a combination of at least two other avatars, the generated avatar having a simulated physical appearance that is defined in terms of a plurality of predetermined inheritable characteristics, at least one of the plurality of predetermined inheritable characteristics having a user defined weighting value associated therewith;
generating a metadata file relating to the generated avatar, the metadata file including at least a unique identifier of each of the at least two other avatars and the user defined weighting value associated with the at least one of the plurality of predetermined inheritable characteristics;
transferring the metadata file via a network to a second computer system that is associated with a second user; and,
generating in dependence upon metadata of the metadata file the avatar locally with respect to the second computer system using an avatar generator process that is in execution thereon.

2. A method according to claim 1, wherein generating the avatar locally with respect to the second computer system comprises:
retrieving from a memory, data relating to the at least one of the plurality of predetermined characteristics of the at least two other avatars; and,
determining the at least one of the plurality of predetermined characteristics of the generated avatar based on the retrieved data and the user defined weighting value extracted from the metadata file, the user defined weighting value for defining a contribution to the at least one of the plurality of predetermined characteristics of the generated avatar from each of the at least two other avatars.

3. A method according to claim 1, comprising at least one of storing data relating to a model of the generated avatar on a computer readable memory storage associated with the second computer system and displaying to the second user an aspect of the avatar.

4. A method according to claim 1, wherein generating the avatar locally with respect to the second computer system comprises:
generating at least one aspect of the avatar in dependence upon a current state of a virtual environment, with respect to a point of view of the second user.

5. A method comprising:
receiving at a first computer system associated with a first user, a metadata file relating to an avatar of a second user, the metadata file comprising data for use with an avatar generator process that is in execution on the first computer system;
extracting data from the metadata file;
providing the extracted data as input data to the avatar generator process that is in execution on the first computer system, thereby generating locally to the first computer system the avatar of the second user; and,
displaying to the first user an aspect of the avatar of the second user within a virtual environment,
wherein the metadata file comprises at least a first unique identifier of a first ancestor avatar, a second unique identifier of a second ancestor avatar, and a user defined weighting factor for defining a contribution from each of the first ancestor avatar and the second ancestor avatar to an inheritable characteristic of the avatar of the second user.

6. A method according to claim 5, wherein the avatar of the second user is generated in dependence upon a current state of the virtual environment from the point of view of the first user.

7. A method according to claim 5, wherein the avatar generator process comprises:
retrieving data relating to each of the first ancestor avatar and the second ancestor avatar in dependence upon the first unique identifier and the second unique identifier, respectively; and,
determining the inheritable characteristic of the avatar of the second user based on the data relating to the inheritable characteristic for each of the first ancestor avatar and the second ancestor avatar and the user defined weighting factor.

8. A method according to claim 5, comprising:
providing a non-physical feature for being associated with the avatar of the second user; and
mapping the non-physical feature onto the avatar of the second user.

9. A method according to claim 8, wherein the metadata file comprises a unique identifier of the non-physical feature.

10. A method according to claim 5, wherein the avatar generator process in execution on the first computer system is an inheritance-based three-generation avatar generator process.

11. A method according to claim 10, wherein the metadata file comprises:
- at least a first unique identifier of a first grandfather avatar, a second unique identifier of a first grandmother avatar, and a first weighting factor for defining a contribution from each of the first grandfather avatar and the first grandmother avatar to an inheritable characteristic of a first parent avatar;
- at least a third unique identifier of a second grandfather avatar, a fourth unique identifier of a second grandmother avatar, and a second weighting factor for defining a contribution from each of the second grandfather avatar and the second grandmother avatar to the inheritable characteristic of a second parent avatar;
- and a third weighting factor for defining a contribution from each of the first parent avatar and the second parent avatar to the inheritable characteristic of the avatar of the second user.

12. A method according to claim 10, comprising:
- providing a non-physical feature for being associated with the avatar of the second user; and
- mapping the non-physical feature onto the avatar of the second user.

13. A method according to claim 12, wherein the metadata file comprises a unique identifier of the non-physical feature.

14. A method according to claim 5, comprising providing the metadata file to the first computer system in dependence upon at least one of the first user initiating an action within the virtual environment and the first user being presented with a choice between a plurality of different actions within the virtual environment.

15. A method according to claim 5, wherein the data file comprises at least one of a physical characteristic of a plurality of physical characteristics, a non-physical feature of a plurality of non-physical features, a unique identifier of the avatar of the second user, an identifier relating to a membership of the virtual environment, a preference of the second user, a restriction established by the second user, a restriction established in dependence of the virtual environment, and an identifier related to the second user.

16. A method according to claim 5, wherein the data file has been generated by the second user with at least one of the virtual environment, an application associated with the virtual environment, in a second virtual environment, and an application associated with the second virtual environment.

17. A method according to claim 5, wherein the metadata file comprises a language identifier determining an aspect of communications between the second user and the first user.

18. A method according to claim 17, wherein the aspect of communications is at least one of a format to present the communications in, the language of text presented to the second user, the language of audio-visual content presented to the second user, and an accepted language for the first user to communicate with the second user.

19. A method according to claim 5, wherein the metadata file is provided from at least one of a second computer system associated with the second user and a server associated with the virtual environment.

20. A method according to claim 5, wherein a first predetermined portion of the metadata file is provided to the first computer system from a first other computer system and a second predetermined portion of the metadata file is provided to the first computer system from a second other computer system, the first other computer system and the second other computer system being selected from the group consisting of a server associated with hosting the virtual environment, an electronic device associated with the second user, and a server not hosting the virtual environment.

21. A method according to claim 20 wherein,
- the first predetermined portion of the metadata file relates to the generation of physical characteristics of the avatar of the second user; and,
- the second predetermined portion of the metadata files relates to the generation of non-physical features of the avatar of the second user.

22. A method according to claim 21, wherein the non-physical feature of the avatar is selected from a group consisting of: clothing, tattoos, body jewelry, body piercing, scars, body hair, body augmentation, and surgical scars.

23. A method according to claim 21, wherein the second predetermined portion of the metadata file is at least one of dynamically updated in dependence upon actions performed within the virtual environment and initiated by the second user and selected from a plurality of possible second predetermined portions of the data file in dependence upon at least one of an identity of the first user, a characteristic of an avatar associated with the first user, and pseudo-randomly.

24. A method comprising:
- receiving at a first computer system associated with a first user a metadata file relating to an avatar of a second other user, the metadata file for supporting the generation of the avatar of the second user upon the first computer system, the metadata file being other than the generated avatar of the second user;
- retrieving at least two avatars from a pool of avatars, each avatar retrieved in dependence upon a predetermined metadatum of the metadata file and having a different simulated physical appearance that is defined in terms of a plurality of inheritable characteristics;
- retrieving a weighting factor for defining a relative contribution of each of the at least two avatars to at least one of the plurality of inheritable characteristics of the avatar of the second user, the weighting factor being a predetermined metadatum of the metadata file; and,
- generating locally to the first computer system the avatar of the second user, based on the plurality of inheritable characteristics of the at least two avatars and the weighting factor.

25. A method according to claim 24, comprising:
- providing a non-physical feature for being associated with the avatar of the second user, the non-physical feature being identified by a unique identifier, and the unique identifier being a metadatum of the metadata file;
- modifying the avatar of the second user so as to form a new avatar, the new avatar formed by mapping the non-physical feature onto the avatar of the second user; and
- storing the new avatar on a computer readable storage medium.

26. A method according to claim 24 wherein,
- a first predetermined portion of the metadata file is provided to the first computer system from a first other computer system, and a second predetermined portion of the metadata file is provided to the first computer system from a second other computer system, each of the first other computer system and second other computer system being selected from the group consisting of: a server associated with hosting the virtual environment, an electronic device associated with the user, and a server not hosting the virtual environment.

27. A method according to claim 26, wherein the second predetermined portion of the metadata file is at least one of dynamically updated in dependence upon actions performed within the virtual environment and initiated by the second user, and selected from a plurality of possible second predetermined portions of the data file in dependence upon at least one of an identity of the first user, a characteristic of an avatar associated with the first user, and pseudo-randomly.

* * * * *